(12) United States Patent
Shinoki et al.

(10) Patent No.: US 12,334,610 B2
(45) Date of Patent: Jun. 17, 2025

(54) FUEL CELL SYSTEM

(71) Applicant: Mitsubishi Electric Corporation, Tokyo (JP)

(72) Inventors: Toshio Shinoki, Tokyo (JP); Masaru Shinozaki, Tokyo (JP); Junichi Nakazono, Tokyo (JP); Makiko Kise, Tokyo (JP); Nozomi Kasahara, Tokyo (JP); Keijun Kasajima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 441 days.

(21) Appl. No.: 17/793,411

(22) PCT Filed: Mar. 30, 2020

(86) PCT No.: PCT/JP2020/014437
§ 371 (c)(1),
(2) Date: Jul. 18, 2022

(87) PCT Pub. No.: WO2021/199103
PCT Pub. Date: Oct. 7, 2021

(65) Prior Publication Data
US 2023/0041819 A1 Feb. 9, 2023

(51) Int. Cl.
*H01M 8/0612* (2016.01)
*H01M 8/04007* (2016.01)
(Continued)

(52) U.S. Cl.
CPC ..... *H01M 8/0618* (2013.01); *H01M 8/04022* (2013.01); *H01M 8/04067* (2013.01);
(Continued)

(58) Field of Classification Search
CPC ............ H01M 8/0618; H01M 8/2457; H01M 8/04022; H01M 8/04067; H01M 8/04164; H01M 8/04716; H01M 8/04761
See application file for complete search history.

(56) References Cited

U.S. PATENT DOCUMENTS

| | | | |
|---|---|---|---|
| 2003/0207163 A1* | 11/2003 | Chen ................. | H01M 8/04014 429/423 |
| 2005/0181247 A1* | 8/2005 | Foger ................ | H01M 8/04014 429/495 |

(Continued)

FOREIGN PATENT DOCUMENTS

| | | |
|---|---|---|
| JP | 63-062159 A | 3/1988 |
| JP | H06111841 A | 4/1994 |

(Continued)

OTHER PUBLICATIONS

Machine Translation of JP-2008108620-A (Nov. 18, 2024) (Year: 2024).*

(Continued)

*Primary Examiner* — Matthew J Merkling
(74) *Attorney, Agent, or Firm* — XSENSUS LLP

(57) ABSTRACT

A fuel cell system includes: a reformer which generates a reformed gas containing hydrogen by reacting hydrocarbon and moisture with each other; a fuel cell stack which generates electric energy through electrochemical reaction of the reformed gas and an oxidant; an ejector which, using steam as a drive fluid, sucks either a raw fuel containing the hydrocarbon or a recycled gas recovered from an anode exhaust gas, and supplies a resultant gas to the reformer; and a vaporizer which generates the steam by vaporizing water, wherein an operation temperature of the fuel cell stack is higher than a boiling point of water at an operation pressure, and the vaporizer generates the steam through heat exchange with the anode exhaust gas.

20 Claims, 11 Drawing Sheets

(51) Int. Cl.
  *H01M 8/04014* (2016.01)
  *H01M 8/04119* (2016.01)
  *H01M 8/04701* (2016.01)
  *H01M 8/04746* (2016.01)
  *H01M 8/2457* (2016.01)

(52) U.S. Cl.
  CPC ... *H01M 8/04164* (2013.01); *H01M 8/04716* (2013.01); *H01M 8/04761* (2013.01); *H01M 8/2457* (2016.02)

(56) References Cited

U.S. PATENT DOCUMENTS

| | | | | |
|---|---|---|---|---|
| 2008/0107932 | A1* | 5/2008 | Pham | C01B 3/382 |
| | | | | 429/495 |
| 2008/0187796 | A1 | 8/2008 | Rainville et al. | |
| 2010/0136443 | A1* | 6/2010 | Vincitore | H01M 8/04007 |
| | | | | 429/423 |

FOREIGN PATENT DOCUMENTS

| | | | | |
|---|---|---|---|---|
| JP | 7-230816 | A | | 8/1995 |
| JP | 11-354145 | A | | 12/1999 |
| JP | 2008108620 | A | * | 5/2008 |
| JP | 2018-170199 | A | | 11/2018 |
| JP | 2018-198116 | A | | 12/2018 |
| KR | 10-2013-0115894 | A | | 10/2013 |
| KR | 20140121696 | A | | 10/2014 |
| WO | WO-2015029886 | A1 | * | 3/2015 ........ H01M 8/04097 |

OTHER PUBLICATIONS

Machine Translation of WO-2015029886-A1 (Nov. 18, 2024) (Year: 2024).*
International Search Report and Written Opinion mailed on Jun. 16, 2020, received for PCT Application PCT/JP2020/014437, filed on Mar. 30, 2020, 11 pages including English Translation.
Chinese Office Action issued Mar. 11, 2025, in corresponding Chinese Patent Application No. 202080098908.4, 15pp.

* cited by examiner

FUEL CELL SYSTEM

CROSS-REFERENCE TO RELATED APPLICATION

The present application is based on PCT filing PCT/JP2020/014437, filed Mar. 30, 2020, the entire contents of which are incorporated herein by reference.

TECHNICAL FIELD

The present disclosure relates to a fuel cell system.

BACKGROUND ART

Fuel cell systems are low in environmental load and high in energy conversion efficiency, and therefore are being increasingly developed as electric generation devices for consumer and industrial applications. In a fuel cell stack, a reformed gas obtained by reforming a hydrocarbon-based material and containing hydrogen, and an oxidant, are caused to undergo electrochemical reaction in a state of being separated from each other via an electrolyte, thus generating electric power. At this time, the residual reformed gas (anode exhaust gas) discharged from an anode contains components such as hydrogen and, depending on conditions, carbon monoxide, methane, and the like, which are reusable as raw fuels. Therefore, the residual reformed gas is used for reaction heat for a reformer or is circulated to a raw fuel supply side, whereby energy of the raw fuel can be effectively used.

In this regard, there is known a technology in which a part of an anode exhaust gas, after moisture thereof is decreased by a gas-liquid separator, is sucked by a source gas pump and mixed into a raw fuel (see, for example, Patent Document 1). In addition, there is known a technology in which an anode exhaust gas is sucked by an ejector using steam generated by combustion heat of the anode exhaust gas as a drive fluid and then is mixed into a raw fuel (see, for example, Patent Document 2).

CITATION LIST

Patent Document

Patent Document 1: Japanese Laid-Open Patent Publication No. 2018-198116 (paragraphs [0051] to [0063], FIG. 1)
Patent Document 2: Japanese Laid-Open Patent Publication No. 7-230816 (paragraphs [0020] to [0024], FIG. 1)

SUMMARY OF THE INVENTION

Problems to be Solved by the Invention

However, an auxiliary motive power source is needed for sucking the anode exhaust gas using the source gas pump. In addition, in the case of using steam generated by combustion heat of the anode exhaust gas as a drive fluid, the combustion heat that the anode exhaust gas has is wasted, so that utilization of the above-described energy that the raw fuel has is decreased. That is, it has been difficult to realize high-efficiency electric generation effectively using energy that the raw fuel has.

The present disclosure has been made to solve the above problem, and an object of the present disclosure is to provide a high-efficiency fuel cell system.

Solution to the Problems

A fuel cell system according to the present disclosure includes: a reformer which generates a reformed gas containing hydrogen by reacting hydrocarbon and moisture with each other; a fuel cell stack which generates electric energy through electrochemical reaction of the reformed gas and an oxidant separated from each other at an anode and a cathode; an ejector which, using, as a drive fluid, steam to be used as the moisture, sucks either a raw fuel containing the hydrocarbon or a recycled gas recovered from an anode exhaust gas, and supplies a resultant gas to the reformer; and a vaporizer which generates the steam by vaporizing water, wherein an operation temperature of the fuel cell stack is higher than a boiling point of water at an operation pressure, and the vaporizer generates the steam through heat exchange with the anode exhaust gas.

Effect of the Invention

In the fuel cell system according to the present disclosure, steam is generated through heat exchange with the anode exhaust gas, whereby energy that the raw fuel has is effectively used and thus efficiency is enhanced.

DESCRIPTION OF EMBODIMENTS

Hereinafter, with reference to the accompanying drawings, a fuel cell system according to the present disclosure will be described in detail for each of embodiments. The embodiments described below are merely examples, and the present disclosure is not limited to these embodiments.

Embodiment 1

Figure 1:
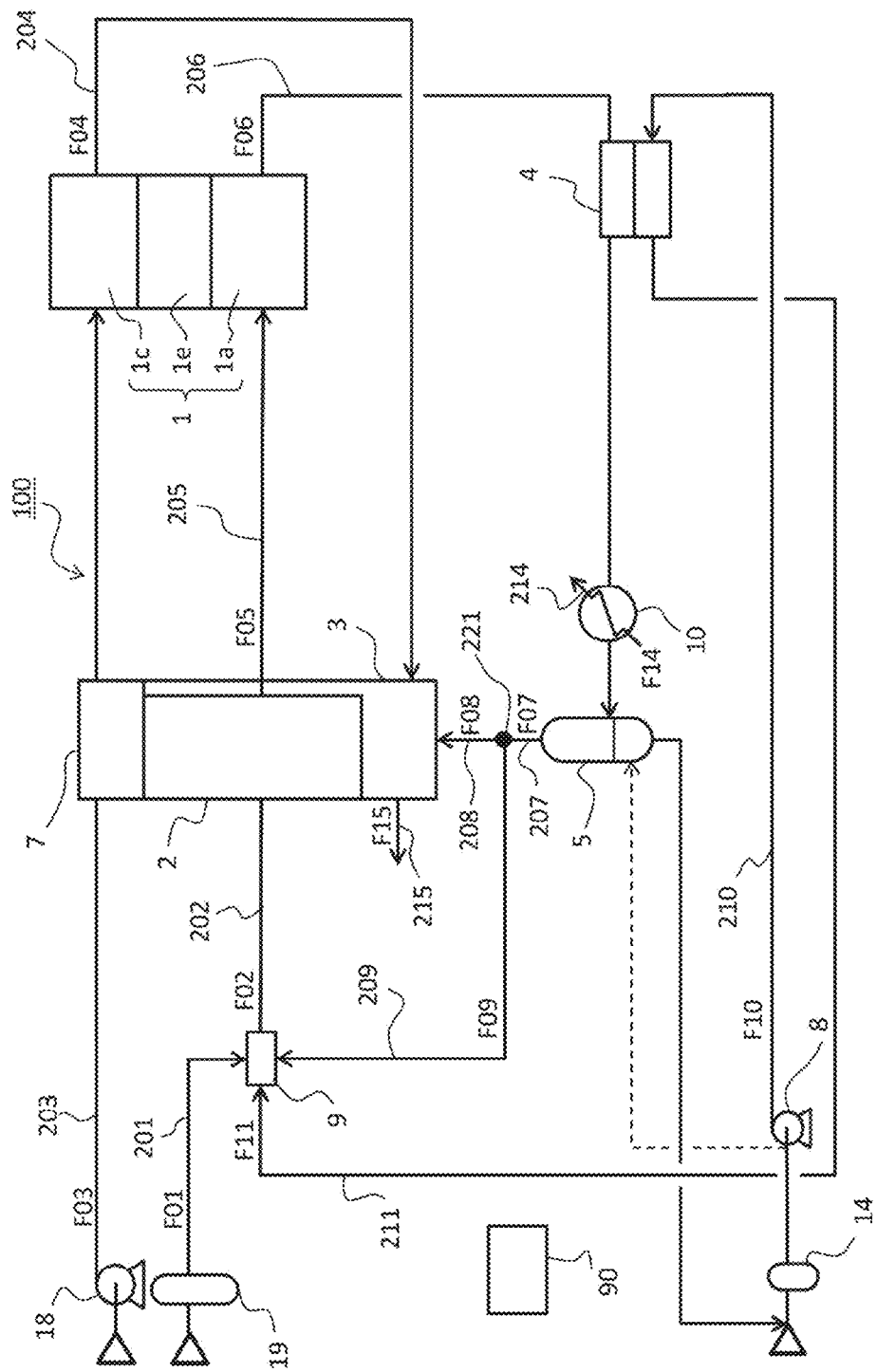
FIG. 1 is a flow diagram showing the configuration of a fuel cell system according to embodiment 1.
Figure 2:
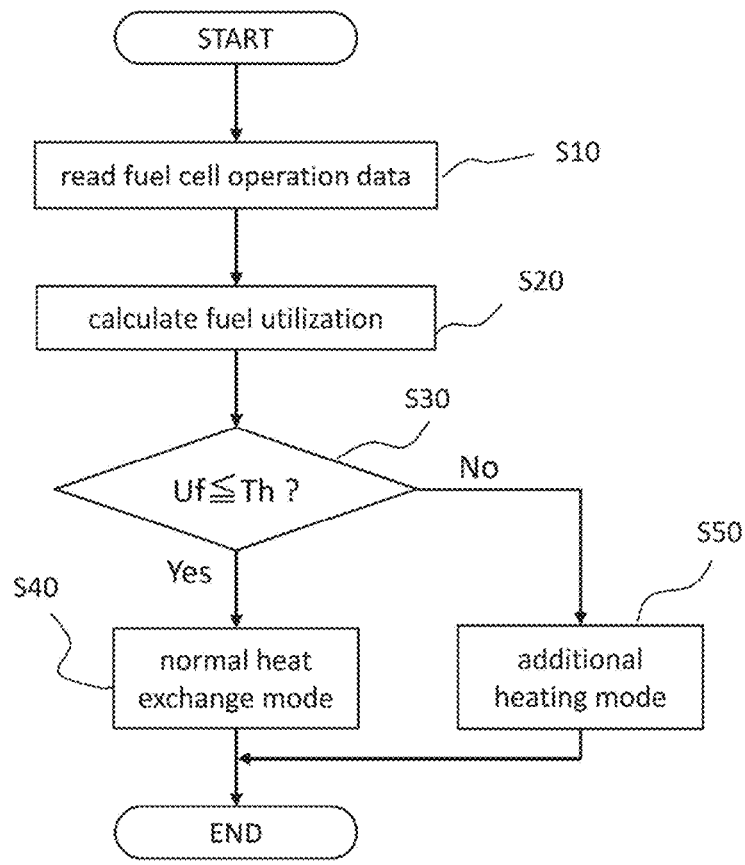
FIG. 2 is a flowchart showing control operation in the fuel cell system according to embodiment 1.
Figure 3:
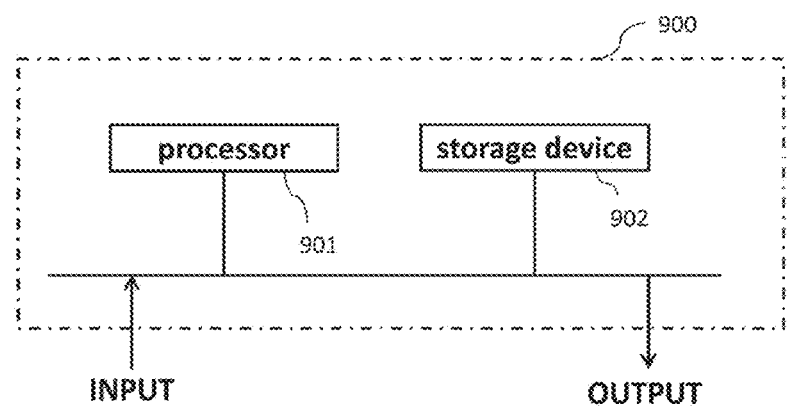
FIG. 3 is a block diagram showing a hardware configuration of a control unit of the fuel cell system or a calculation execution part for implementing the control, according to each of embodiment 1 and the subsequent embodiments.

FIG. 1 to FIG. 3 illustrate the configuration and control operation of a fuel cell system according to embodiment 1. FIG. 1 is a schematic flow diagram showing the configuration of the fuel cell system, and FIG. 2 is a flowchart illustrating a process for changing an operation mode in accordance with a fuel utilization in the control operation. FIG. 3 is a block diagram showing a hardware configuration of a control unit for performing control of the fuel cell system or a calculation execution part for executing the control, according to each of embodiment 1 and the subsequent embodiments.

Before describing a characteristic configuration of the fuel cell system according to the present disclosure, a configuration and an operation common with a general fuel cell system will be described with reference to the drawing showing the configuration of the fuel cell system according to embodiment 1. As shown in FIG. 1, a fuel cell system 100 includes a reformer 2 for reforming a raw fuel, a fuel cell stack 1 for generating electric power by causing a reformed gas and an oxidant to undergo electrochemical reaction, devices for processing the raw fuel, the oxidant (air), and a fluid derived from water, and a control unit 90 for controlling the devices.

For receiving supply of heat needed for reforming reaction, the reformer 2 is integrated with a combustor 3 which combusts a part of fuel (recycled combustion gas F08) to generate heat. In addition, for raising the temperature of an oxidant F03 to be supplied to the fuel cell stack 1, an oxidant heat exchanger 7 is also integrated therewith. In the fuel cell stack 1, an electrochemical device composed of an anode (negative electrode) 1a, a cathode (positive electrode) 1c, and an electrolyte 1e is incorporated using cell members such as a flow path, a separator, and the like.

In an oxidant system 203 through which the oxidant F03 supplied from an air blower 18 flows, the oxidant F03 passes through the oxidant heat exchanger 7, to be heated to a temperature suitable for operation of the fuel cell stack 1, and then is supplied to the cathode 1c part. The oxidant F03 supplied to the cathode 1c undergoes electrochemical reaction in a state of being separated from reformed gas F05 via the electrolyte 1e, so that oxygen thereof is partially consumed, and a cathode exhaust gas F04 after the consumption passes through a cathode exhaust gas system 204, to be supplied to the combustor 3.

A raw fuel F01 such as city gas passes through a raw fuel pretreatment device 19 which removes unnecessary components such as a sulfur component, and then flows through a raw fuel system 201. Then, by a circulator 9, the raw fuel F01 is accompanied with an anode circulation gas F09 and steam F1l described later and then is supplied as a fuel gas F02 through a fuel gas system 202 to the reformer 2. The reformed gas F05 reformed by the reformer 2 so as to contain hydrogen as a main component flows through a reformed gas system 205, to be supplied to the anode 1a part of the fuel cell stack 1.

The reformed gas F05 supplied to the anode 1a undergoes electrochemical reaction in a state of being separated from the oxidant F03 via the electrolyte 1e, so that the fuel is partially consumed. An anode exhaust gas F06 after the consumption flows through an anode exhaust gas system 206, and then is cooled by a heat recovery cooler 10, to be supplied to a water separator 5. A gas component separated by the water separator 5 flows as an anode recovered gas F07 through an anode recovered gas system 207, and then is branched by a recovery branch portion 221 into a recycled combustion gas system 208 leading to the combustor 3 and an anode circulation gas system 209 returning to the reformer 2. Meanwhile, a liquid component (water) separated by the water separator 5 is returned to a water treatment device 14 described below. A coolant F14 flowing through the heat recovery cooler 10 flows in a heat recovery system 214.

As circulation water F10, the water recovered by the water separator 5 described above and source water merge and pass through the water treatment device 14 in which unnecessary components such as ion components are removed, and then the circulation water F10 is circulated by a water pump 8 through a circulation water system 210 to a vaporizer 4. The steam F11 vaporized by the vaporizer 4 flows through a steam system 211 to the circulator 9, and acts as a drive fluid at the circulator 9, whereby the raw fuel F01 and the anode circulation gas F09 are sucked and then the resultant gas flows through the fuel gas system 202.

Here, the raw fuel pretreatment device 19 is, for example, a filter, a desulfurizer, or the like. As the raw fuel F01, gas containing hydrocarbon such as methane gas, propane gas, butane gas, natural gas, city gas, or digestion gas containing methane gas as a main component, may be used. Alternatively, various types of alcohols, petroleum-based raw fuels, or the like may be used. In a case of using a hydrophilic liquid raw fuel, the hydrophilic liquid raw fuel may be mixed in circulation water in advance. On the other hand, in a case of using a hydrophobic liquid raw fuel, the raw fuel alone may be preheated and vaporized, or the raw fuel may be preheated while being mixed with the steam F11, and vaporized.

In the reformer 2, for example, steam reforming reaction is performed. Typical reforming reactions in a case of using methane as a raw fuel are represented by Equation (1) and Equation (2). With a reforming catalyst stored inside the reformer 2, methane and steam undergo endothermic reaction to generate hydrogen. In general, the flow rate of steam to be supplied to the reformer 2 is represented as S/C which is a mole fraction of the steam to C contained in the fuel gas, and is set to be constant within a range of about 2.5 to 3.5. As the reforming catalyst, for example, a Ni-based, Pt-based, or Ru-based material, etc., may be supported on a support material such as $Al_2O_3$ or MgO.

$$CH_4 + H_2O \leftrightarrow CO + 3H_2 \qquad (1)$$

$$CO + H_2O \leftrightarrow CO_2 + H_2 \qquad (2)$$

Here, the steam reforming reaction has been shown as an example. However, without limitation thereto, partial oxidation reforming reaction or autothermal reforming reaction with air separately introduced (not shown) into the reformer 2 may be used. Further, in a process for start and stop, the above reforming reactions may be switched and used.

Meanwhile, in the fuel cell stack 1, the reformed gas F05 supplied to the anode 1a and the oxidant F03 supplied to the cathode 1c are caused to undergo electrochemical reaction in a state of being separated from each other via the electrolyte 1e, whereby electrons are passed and received therebetween and thus electric power is generated. More specifically, a potential arises in the fuel cell stack 1 so that ions are passed and received via the electrolyte 1e and electrons are passed and received in a circuit via output terminals on both sides of the anode 1a and the cathode 1c at the same time.

Movement of electrons (DC current) in the circuit at this time is outputted as power (not shown).

Regarding the electrochemical reaction in the fuel cell stack 1, the electrode materials, the operation temperature, and the like differ depending on the kind of the electrolyte 1e. In addition, the kinds of ions moving through the electrolyte 1e also differ. For example, hydrogen ions move in a solid polymer type and a phosphoric acid type, carbonate ions move in a molten carbonate type, and oxygen ions move in a solid oxide type. In particular, in the molten-carbonate-type fuel cell (about 600 to 700° C.) and the solid-oxide-type fuel cell (about 600 to 1000° C.) which operate at high temperatures, water is generated from hydrogen by electrode reaction at the anode 1a, and therefore in the anode 1a, the steam content increases toward the exit.

For example, in a case of the solid-oxide-type fuel cell, electrode reaction at the anode 1a is represented by Equation (3), and electrode reaction at the cathode 1c is represented by Equation (4).

$$H_2 + O^{2-} \rightarrow H_2O + 2e^- \qquad (3)$$

$$\tfrac{1}{2}O_2 + 2e^- \rightarrow O^{2-} \qquad (4)$$

At the anode 1a, hydrogen corresponding to the amount of moved electrons is consumed through the electrode reaction so that the hydrogen partial pressure decreases toward the anode exit, while the same amount of water is generated so that the steam partial pressure increases. Meanwhile, at the cathode 1c, oxygen corresponding to the amount of moved electrons is consumed through the electrode reaction so that the gas flow rate and the oxygen partial pressure both decrease toward the cathode exit. In the case of the solid-oxide-type fuel cell, internal reformation in which electrode reaction and reforming reaction progress simultaneously can be performed in the anode 1a, and thus reforming reaction of the remaining methane that has not been reformed by the reformer 2 can be caused to progress in a direction of generating hydrogen.

Here, in the fuel cell stack 1, the flow rate of hydrogen consumed through electrode reaction at the anode 1a is often set to approximately 0.60 to 0.85 relative to the flow rate of supplied hydrogen. In addition, the amount of oxygen consumed through electrode reaction at the cathode 1c is often set to approximately 0.15 to 0.50 relative to the flow rate of supplied oxygen. That is, the remaining fuel is contained at the anode exit, and the remaining oxygen is contained at the cathode exit. For example, the volume mole fraction of hydrogen in the anode exhaust gas F06 is about 12%, and that of steam is about 60%, while the volume mole fraction of oxygen in the cathode exhaust gas F04 is about 16%.

On the premise of the general configuration and the basic operation described above, the fuel cell system 100 of the present disclosure will be described below. In the fuel cell system 100 according to embodiment 1 of the present disclosure, as a heat source for the vaporizer 4, temperature difference from the anode exhaust gas F06 is used, and the same also applies to the fuel cell system 100 according to each of the subsequent embodiments. The details of a configuration and a control operation for assuredly vaporizing the circulation water F10 using the anode exhaust gas F06 will be described.

Here, in the fuel cell system 100 of the present disclosure, the anode exhaust gas F06 discharged from the anode 1a passes through the vaporizer 4, and with the temperature difference from the anode exhaust gas F06 used as drive force, thermal energy is given to the circulation water F10 and thus is used as a heat source for the vaporizer 4 to produce the steam F11. The anode exhaust gas F06 having a lowered temperature by giving thermal energy to the circulation water F10 in the vaporizer 4 further gives thermal energy to a medium (coolant F14) flowing through the heat recovery system at the heat recovery cooler 10, so that the temperature of the anode exhaust gas F06 lowers to a predetermined temperature that is a dew point or lower, and then the anode exhaust gas F06 is introduced into the water separator 5.

In order to achieve the predetermined temperature, the flow rate of the coolant F14 is controlled using a temperature sensor (not shown). In the water separator 5, by a saturation vapor pressure with respect to the predetermined temperature, moisture contained in the anode exhaust gas F06 condenses and is separated as water droplets, which are stored in a lower part. The stored water passes through the water treatment device 14 and is supplied as the circulation water F10 from the water pump 8 to the vaporizer 4, in accordance with the flow rate required for the fuel gas F02. Meanwhile, the anode recovered gas F07 from which predetermined moisture has been removed in the water separator 5 passes through the anode recovered gas system 207, to be supplied to the recovery branch portion 221. At the recovery branch portion 221, the anode recovered gas F07 is branched into the recycled combustion gas F08 and the anode circulation gas F09, and the recycled combustion gas F08 passes through the recycled combustion gas system 208, to be supplied to the combustor 3.

In the combustor 3, the recycled combustion gas F08 and the cathode exhaust gas F04 discharged from the cathode 1c and supplied through the cathode exhaust gas system 204 are combusted. The combusted gas gives thermal energy needed for reforming reaction in the reformer 2, so that the reforming reaction temperature becomes 600° C., for example. Further, thermal energy is given to the oxidant F03 in the oxidant heat exchanger 7, so that the temperature thereof is raised to a temperature that allows the cathode 1c of the fuel cell stack 1 to operate, e.g., from the ambient temperature 25° C. to 550° C. After giving thermal energy to the reformer 2 and the oxidant heat exchanger 7, the combusted gas is discharged as a combusted exhaust gas F15 through a combusted exhaust gas system 215.

The anode circulation gas F09 passes through the anode circulation gas system 209, to be supplied to the circulator 9. The circulator 9 is, for example, an ejector using the steam F1l as a drive fluid. The steam F11 is jetted from a nozzle provided inside the ejector, and the momentum of the jetted steam F11 is given to the raw fuel F01 and the anode circulation gas F09 which are thus sucked.

Whether or not the above operation is possible will be discussed on the basis of enthalpy per output of the fuel cell stack 1 (hereinafter, referred to as output enthalpy). As an example of the fuel cell system 100, a solid-oxide-type fuel cell using city gas as a raw fuel is operated at a fuel utilization of 75%, cell voltage of 0.84 V, and current of 24 A. In this condition, the output enthalpy of the anode exhaust gas F06 at the anode exit is −3081 J/s·kW. Vaporization heat needed for obtaining the steam F11 from the circulation water F10 is estimated to be 247 J/s·kW. Therefore, the anode exhaust gas F06 after giving thermal energy to the vaporizer 4 exceeds 150° C. on the basis of heat balance calculation. That is, through heat exchange with the anode exhaust gas F06, thermal energy needed for generation of the steam F11 (evaporation) in the vaporizer 4 can be covered.

Here, as an example of establishment of thermal energy balance, the case where the fuel utilization which is the operation condition of the fuel cell stack 1 is a general value of 75%, has been shown. However, in a case of operating at a high fuel utilization, thermal energy of the anode exhaust gas F06 discharged from the fuel cell stack 1 decreases, so that necessary evaporation heat might not be obtained. For example, it is considered that, when the fuel utilization becomes 80%, the temperature of the anode exhaust gas F06 discharged from the vaporizer 4 becomes 100° C., and further, when the fuel utilization becomes 83%, the temperature of the anode exhaust gas F06 discharged from the vaporizer 4 becomes 60° C.

Thus, in a case of operating at a fuel utilization of 80% or higher, thermal energy needed for generating steam is assumed to be insufficient. Therefore, in the case of operating at a fuel utilization of 80% or higher, it is desirable that the circulation water F10 introduced into the vaporizer 4 is additionally heated. Accordingly, for example, it is conceivable that the control unit 90 performs operation control so as to change the operation mode in accordance with the fuel utilization.

Specifically, as shown in FIG. 2, the flow rate of the reformed gas F05 flowing into the fuel cell stack 1 and fuel cell operation data such as DC current outputted from the fuel cell stack are periodically read (step S10). The fuel utilization is calculated from the read data (step S20), and whether or not the calculated fuel utilization Uf is equal to or smaller than a threshold Th is determined (step S30).

If the fuel utilization Uf is equal to or smaller than the threshold Th ("Yes" in step S30), a normal heat exchange mode in which vaporization is performed with only thermal energy of the anode exhaust gas F06 is kept (step S40). On the other hand, if the fuel utilization Uf is greater than the threshold Th ("No" in step S30), it is determined that the amount of heat is insufficient with only heat exchange, and the mode is changed to an additional heating mode (step S50). In the additional heating mode, heat may be added by an auxiliary combustor 4a described later or the like, or heating may be performed using a heater provided separately. In any case, it is possible to immediately execute a measure against insufficiency of the amount of heat as compared to, for example, a case of coping after insufficiency of the flow rate of the steam F11 or temperature reduction of the vaporizer 4 is detected, and thus stable operation can be achieved.

In the fuel cell system 100 according to each of embodiment 1 and the subsequent embodiments, if the control unit 90 is denoted as, for example, hardware 900, the hardware 900 is composed of a processor 901 and a storage device 902 as shown in FIG. 3, for example. The storage device 902 is provided with a volatile storage device such as a random access memory (not shown) and a nonvolatile auxiliary storage device such as a flash memory. Instead of the flash memory, an auxiliary storage device of a hard disk may be provided. The processor 901 executes a program inputted from the storage device 902. In this case, the program is inputted from the auxiliary storage device to the processor 901 via the volatile storage device. The processor 901 may output data such as a calculation result to the volatile storage device of the storage device 902, or may store such data into the auxiliary storage device via the volatile storage device.

The predetermined temperature that is the dew point or lower in the water separator 5 is set to, for example, about 60° C. In this case, the saturation vapor pressure is about 0.025 MPa. Thus, from the state in which the volume mole fraction of steam contained in the anode exhaust gas F06 is about 60%, condensation into water occurs, so that the flow rate is halved and the volume mole fraction of the steam is reduced to about 20%, thus obtaining the anode recovered gas F07. Further, at the recovery branch portion 221, the anode recovered gas F07 is distributed to the recycled combustion gas F08 and the anode circulation gas F09 at approximately equal flow rates.

Thus, the flow rate of the anode circulation gas F09 is about ¼ of the flow rate of the anode exhaust gas F06. In addition, the flow rate of steam contained in the anode circulation gas F09 is about 8% of the flow rate of steam contained in the anode exhaust gas F06. The flow rate of steam contained in the anode exhaust gas F06 is only about 15% of the steam flow rate needed for the reformer 2 or the fuel cell stack 1, and therefore, for the remaining part, the circulation water F10 is vaporized by the vaporizer 4, to obtain the steam F11 at about 0.5 MPa.

According to the present disclosure, in the anode exhaust gas system 206, phase change by condensation does not occur until the gas reaches the heat recovery cooler 10. Therefore, pulsation of the flow rate of gas passing through the fuel cell stack 1 is small and output from the fuel cell stack 1 is stabilized. In addition, since extra energy is not used for generating the steam F11, it is possible to realize the fuel cell system 100 having high efficiency and stabilized output. At this time, such a system can be easily realized even with a molten-carbonate-type fuel cell which is operated at 600° C. or higher, besides the solid-oxide-type fuel cell used in the above example. Further, also in a phosphoric-acid-type fuel cell whose operation temperature is lower than that of the above fuel cell, operation is performed at around 200° C. which is higher than the boiling point of water at the operation pressure, and therefore this can be used for generation of the steam F11. In addition, even if the heat amount does not reach the total heat amount needed for generation of the steam F11, it is possible to use the heat amount at least for preheating the circulation water F10.

In the fuel cell system 100, the steam F11 is supplied to the reformer 2 and then the resultant gas is supplied to the anode 1a of the fuel cell stack 1, and after electrochemical reaction, the resultant gas is discharged from the anode 1a. Without being influenced by a gas condition of the cathode 1c and the like, steam is generated by using thermal energy from gas flowing through the anode 1a (anode exhaust gas F06), and this makes it possible to perform control of the fuel cell system 100 in accordance with the operation state of the fuel cell stack 1.

Specifically, in a case where the fuel cell system 100 performs part-load operation in accordance with the load, the operation temperature of the fuel cell stack 1 is kept approximately constant and the gas flow rate is increased/decreased in accordance with the load (current). That is, the amount of steam supplied together with the raw fuel is approximately proportional to the flow rate of the anode exhaust gas. Further, by providing the vaporizer 4 without providing another device on the downstream side of the anode exit, it becomes possible to obtain thermal energy needed for vaporization from the anode exhaust gas F06 in accordance with the operation state of the fuel cell stack 1, and thus system controllability can be simplified.

Further, the flow rate ratio of the anode circulation gas F09 to the steam F11 can be reduced, and an ejector using the steam F11 as a drive fluid can be applied to the circulator 9. The ejector is a device that sucks another fluid using the momentum of the drive fluid. Therefore, since motive power is not needed, auxiliary motive power sources for the system can be decreased and maintenance is almost not needed. Thus, the fuel cell system 100 having high efficiency and high reliability can be realized.

Further, with the momentum of the steam F11, it is possible to suck not only the anode circulation gas F09 but also the raw fuel F01. Therefore, an auxiliary device such as a blower for increasing the pressure of the raw fuel is not needed, and thus the fuel cell system having further enhanced efficiency and reliability can be realized. In addition, for example, the flow rate of the anode exhaust gas F06 is about ¼ of that of the combusted exhaust gas F15, and thus the flow rate of gas flowing through the vaporizer 4 is small. Therefore, the vaporizer 4 can be compact, and owing to decrease in the heat dissipation amount, efficiency is improved, and the cost is reduced.

Modification

Figure 4:
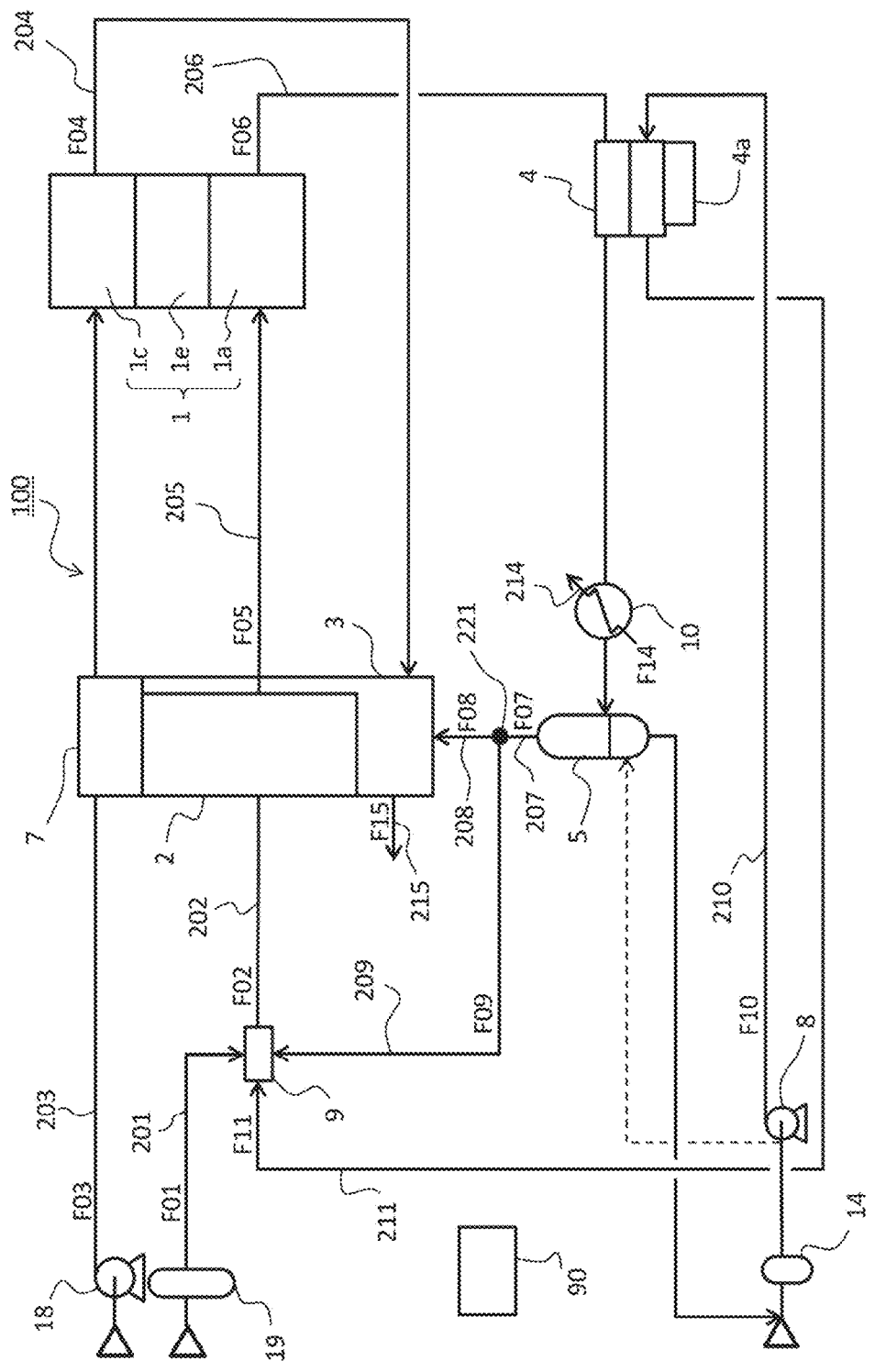
FIG. 4 is a flow diagram showing the configuration of a fuel cell system according to a modification of embodiment 1.

In this modification, an example in which an auxiliary combustor for compensating for heat amount insufficiency in the vaporizer is provided will be described. FIG. 4 is a schematic flow diagram illustrating the configuration of the fuel cell system according to the modification. The configurations other than the configuration of the vaporizer provided with the auxiliary combustor are the same as those in the above example, and the description of the same parts is omitted.

In the fuel cell system 100 according to the modification, as shown in FIG. 4, the vaporizer 4 is provided with the auxiliary combustor 4a thermally integrated therewith. As the auxiliary combustor 4a, for example, a burner or a catalytic combustor is applicable. Thus, in the case where the fuel utilization becomes higher than the predetermined value so that additional heating is needed as described in FIG. 2 (step S50), a necessary amount of steam can be obtained with heat generated by the auxiliary combustor.

Further, at the time of starting the fuel cell system 100, for example, there is a case where the water amount in the water separator 5 is less than a predetermined amount and water is supplied from the outside, that is, operation different from normal operation may be performed. Therefore, there is a case where start-up can be smoothly performed by using the auxiliary combustor 4a irrespective of the fuel utilization.

Specifically, the oxidant F03 from the air blower 18 passes through the cathode 1c of the fuel cell stack 1 and then is supplied to the combustor 3, and the raw fuel is supplied through a system (not shown) to the combustor 3, to be combusted with the oxidant F03. The combusted gas gives thermal energy to the reformer 2 and the oxidant heat exchanger 7, and then is discharged as the combusted exhaust gas F15 through the combusted exhaust gas system 215. In the oxidant heat exchanger 7, the temperature of the oxidant F03 is raised, and the oxidant F03 having the raised temperature gives heat to the fuel cell stack 1, thus raising the temperature of the fuel cell stack 1.

Through the temperature raising, the temperature condition for causing reforming reaction in the reformer 2 is satisfied, and at the timing of setting the anode 1a of the fuel cell stack 1 into a reducing atmosphere, the steam F1l is supplied from the steam system 211 and the raw fuel F01 is supplied from the raw fuel system 201. At this time, in the vaporizer 4, thermal energy for vaporizing water cannot be obtained and therefore thermal energy is given to the vaporizer 4 by using the auxiliary combustor 4a, thus generating steam. Then, at the timing when it becomes possible to obtain predetermined thermal energy from the anode exhaust gas F06, heating by the auxiliary combustor 4a is stopped, and the energy source for vaporizing the circulation water F10 is switched from the auxiliary combustor 4a to the anode exhaust gas F06.

In the above description, an example of operation of the auxiliary combustor 4a at the time of temperature raising has been shown. However, also in another condition such as when the temperature of the fuel cell system 100 is lowered, if thermal energy is insufficient for steam generation in the vaporizer 4, the auxiliary combustor 4a may be operated intermittently or continuously.

According to the present disclosure, even in such an operation condition that thermal energy needed for the vaporizer 4 is temporarily insufficient with only the anode exhaust gas F06, the steam F11 can be stably generated and thus the fuel cell system 100 having high efficiency can be operated more stably.

Embodiment 2

Figure 5:
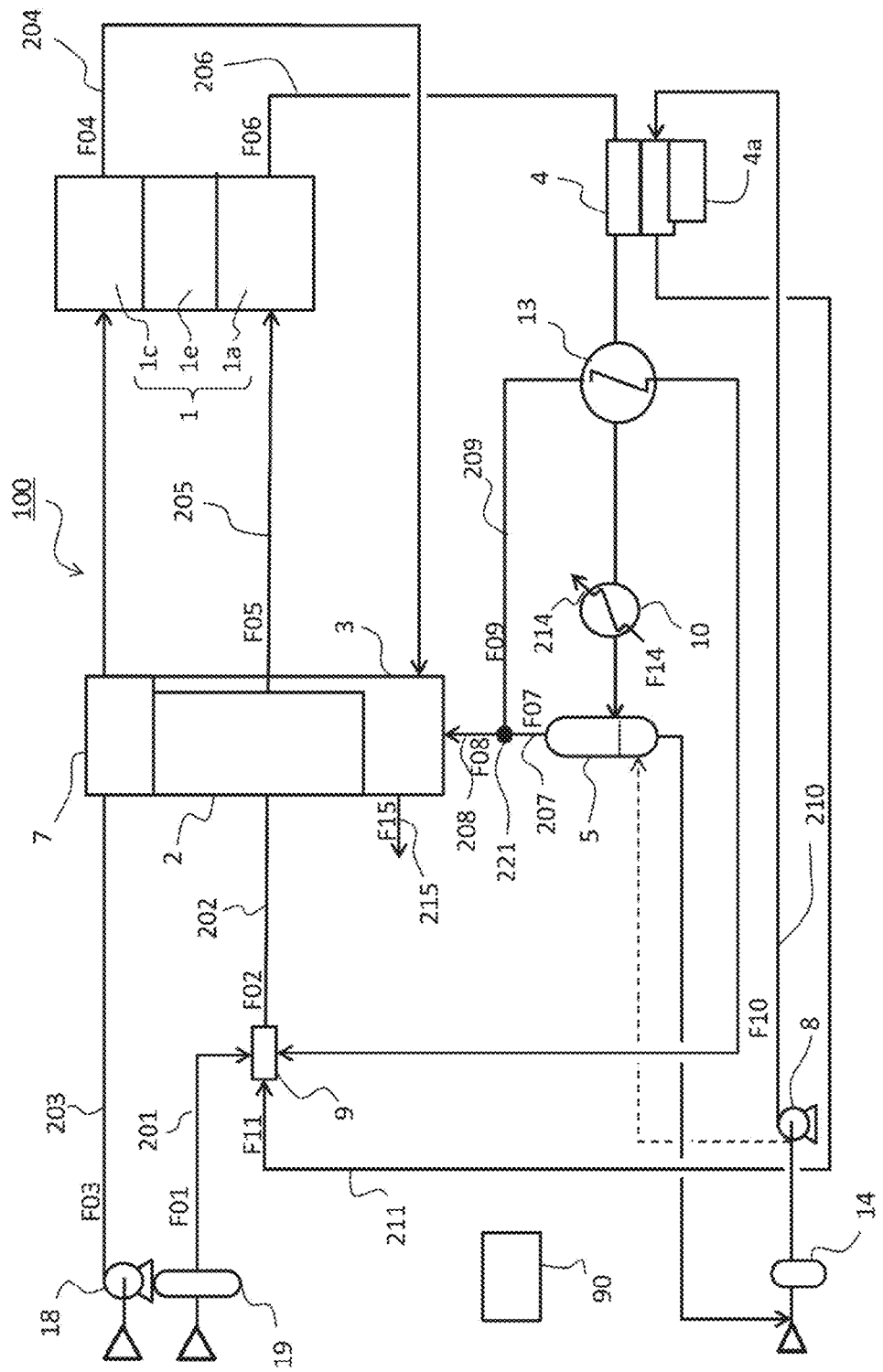
FIG. 5 is a flow diagram showing the configuration of a fuel cell system according to embodiment 2.

In the above embodiment 1, the example in which the anode circulation gas from which water droplets are removed in the water separator is sent as it is, to the circulator, has been described. In embodiment 2, an example in which, after water droplets are removed, the anode circulation gas is preheated and then sent to the circulator, will be described. FIG. 5 is a schematic flow diagram showing the configuration of a fuel cell system according to embodiment 2. In the example shown in FIG. 5, a configuration needed for preheating the anode circulation gas is added to the configuration in FIG. 4 used in the description of the fuel cell system according to the modification of embodiment 1. In addition, the configurations other than the configuration for preheating the anode circulation gas are the same as those in embodiment 1. Regarding control operation and the like, FIG. 2 and FIG. 3 used in embodiment 1 are applied also here, and the description of the same parts as those in embodiment 1 is omitted.

In the fuel cell system 100 according to embodiment 2, as shown in FIG. 5, a circulation heat exchanger 13 is provided between the vaporizer 4 and the heat recovery cooler 10 in the anode exhaust gas system 206 and between the recovery branch portion 221 and the circulator 9 in the anode circulation gas system 209. With this configuration, the anode exhaust gas F06 discharged from the vaporizer 4 gives thermal energy to the anode circulation gas F09 via the circulation heat exchanger 13. Thus, the temperature of the anode exhaust gas F06 is further lowered from the temperature lowered by the vaporizer 4 and conversely, the temperature of the anode circulation gas F09 can be raised from the temperature lowered by the heat recovery cooler 10.

According to the present disclosure, through the circulation heat exchanger 13, thermal energy is given from the anode exhaust gas F06 to the anode circulation gas F09 made into a saturated vapor state by the water separator 5, whereby the temperature of the anode circulation gas F09 is made higher than the dew point so that the relative humidity is lowered. As a result, steam contained in the anode circulation gas F09 flowing between the circulation heat exchanger 13 and the circulator 9 can be prevented from being condensed in a pipe. Thus, the flow rate of the anode circulation gas F09 can be stabilized, and accuracy of the flow rate of steam in the anode circulation gas F09 is improved, whereby the fuel cell system having high performance and stabilized output can be realized.

Embodiment 3

Figure 6:
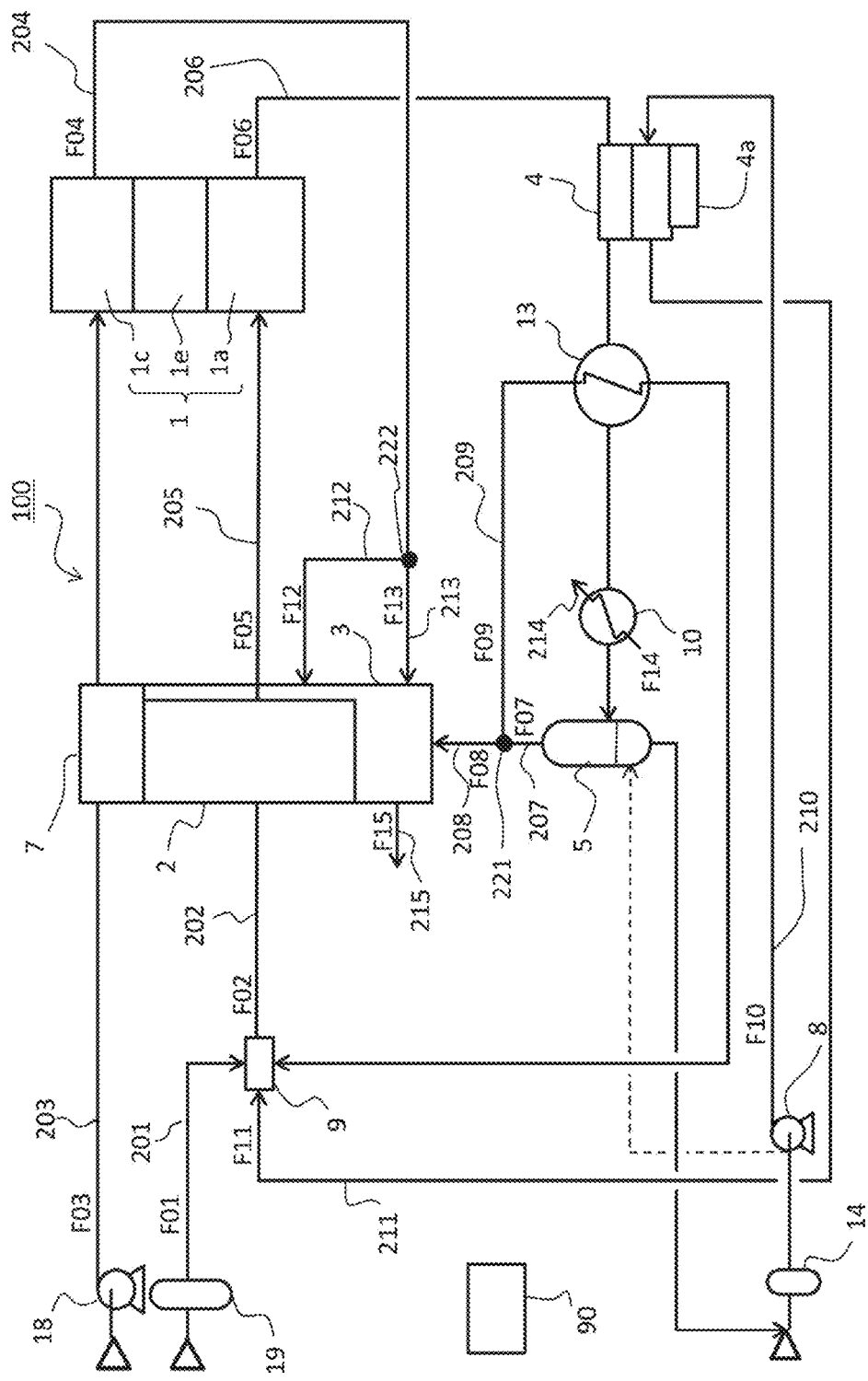
FIG. 6 is a flow diagram showing the configuration of a fuel cell system according to embodiment 3.

In the above embodiments 1 and 2, regarding the cathode exhaust gas, only the configuration in which the cathode exhaust gas is simply supplied to the combustor has been shown. In embodiment 3, an example of a configuration that allows the cathode exhaust gas to be distributed in accordance with roles will be described. FIG. 6 is a schematic flow diagram showing the configuration of a fuel cell system according to embodiment 3. In the example shown in FIG. 6, a configuration needed for distributing the cathode exhaust gas is added to the configuration in FIG. 5 used in the description of the fuel cell system according to embodiment 2. The configurations other than the configuration for distributing the cathode exhaust gas may be the same as those in embodiments 1 and 2. Regarding control operation and the like, FIG. 2 and FIG. 3 used in embodiment 1 are applied also here, and the description of the same parts as those in embodiments 1 and 2 is omitted.

In the fuel cell system 100 according to embodiment 3, as shown in FIG. 6, an air branching portion 222 is provided to the cathode exhaust gas system 204 through which the cathode exhaust gas F04 flows. Thus, the cathode exhaust gas system 204 is branched into a preheating support gas system 212 connected to the reformer 2 and a combustion support gas system 213 connected to the combustor 3. That is, the cathode exhaust gas F04 is used as a preheating support gas F12 to be supplied to the reformer 2 and as a combustion support gas F13 to be supplied to the combustor 3, separately from each other.

Thermal energy of the preheating support gas F12 branched at the air branching portion 222 is used as part of thermal energy for reforming reaction in the reformer 2 and part of thermal energy for heating the oxidant F03 in the oxidant heat exchanger 7. On the other hand, the combustion support gas F13 supplied to the combustor 3 is combusted with the recycled combustion gas F08. The thermal energy of the combustion is used as the remaining thermal energy needed for reforming reaction in the reformer 2 and the remaining thermal energy needed for heating the oxidant F03. Then, the resultant gas is discharged together with the preheating support gas F12, as the combusted exhaust gas F15, from the combusted exhaust gas system 215.

According to the present disclosure, the cathode exhaust gas F04 discharged from the cathode 1c of the fuel cell stack 1 can be branched by the air branching portion 222 so that combustion in the combustor 3 occurs in a stable range. Thus, combustion performance of the combustor 3 is stabilized. In addition, thermal energy to be given to the reformer 2 can be effectively used. Thus, the composition of the reformed gas F05 discharged from the reformer 2 is stabilized, and thermal efficiency of the reformer 2 is improved, whereby the fuel cell system having high performance and stabilized electric output can be realized.

Embodiment 4

Figure 7:
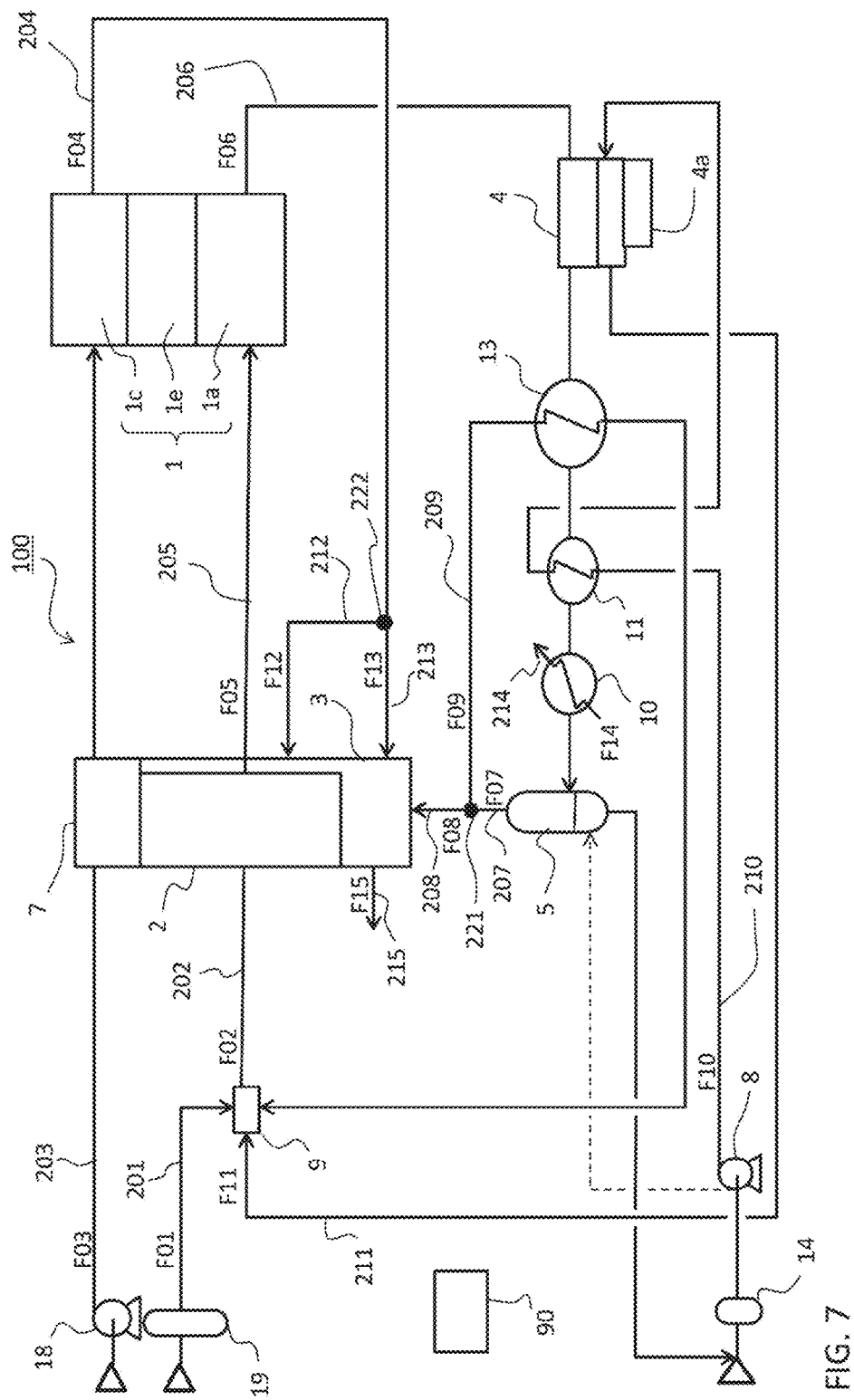
FIG. 7 is a flow diagram showing the configuration of a fuel cell system according to embodiment 4.

In the above embodiments 1 to 3, regarding the circulation water, only the configuration in which the circulation water is simply supplied to the vaporizer has been shown. In embodiment 4, an example of a configuration that allows the circulation water to receive heat from the anode exhaust gas before the circulation water is supplied to the vaporizer, will be described. FIG. 7 is a schematic flow diagram showing the configuration of a fuel cell system according to embodiment 4. In the example shown in FIG. 7, a configuration needed for heat exchange between the circulation water and the anode exhaust gas is added to the configuration in FIG. 6 used in the description of the fuel cell system according to embodiment 3. The configurations other than the configuration for heat exchange between the circulation water and the anode exhaust gas may be the same as those in embodiments 1 to 3. Regarding control operation and the like, FIG. 2 and FIG. 3 used in embodiment 1 are applied also here, and the description of the same parts as those in embodiments 1 to 3 is omitted.

In the fuel cell system 100 according to embodiment 4, as shown in FIG. 7, a water heat exchanger 11 for performing heat exchange is provided between the circulation water F10 flowing through the circulation water system 210 and the anode exhaust gas F06 flowing through the anode exhaust gas system 206. The water heat exchanger 11 is provided between the circulation heat exchanger 13 and the heat recovery cooler 10 in the anode exhaust gas system 206 and between the water pump 8 and the vaporizer 4 in the circulation water system 210.

The anode exhaust gas F06 discharged from the circulation heat exchanger 13 gives thermal energy to the circulation water F10 flowing from the water pump 8, via the water heat exchanger 11. Thus, the temperature of the anode exhaust gas F06 is lowered, and conversely, the temperature of the circulation water F10 is raised. At this time, since the water heat exchanger 11 is provided not on the upstream side of the circulation heat exchanger 13 but on the downstream side thereof in the anode exhaust gas system 206, the temperature of the anode circulation gas F09 can be assuredly raised.

According to the present disclosure, the circulation water F10 is heated in advance from the anode exhaust gas F06 via the water heat exchanger 11, whereby thermal energy needed for generating steam in the vaporizer 4 can be reduced by about 10% per output of the fuel cell stack 1. Thus, allowance with respect to usage of thermal energy of the anode exhaust gas F06 is improved and the required operation range of the auxiliary combustor 4a is narrowed, whereby the fuel cell system having high performance can be realized. As a matter of course, the above configuration is also applicable to the fuel cell system 100 according to embodiment 1 or 2 in which the circulation heat exchanger 13 is not provided.

Modification

Figure 8:
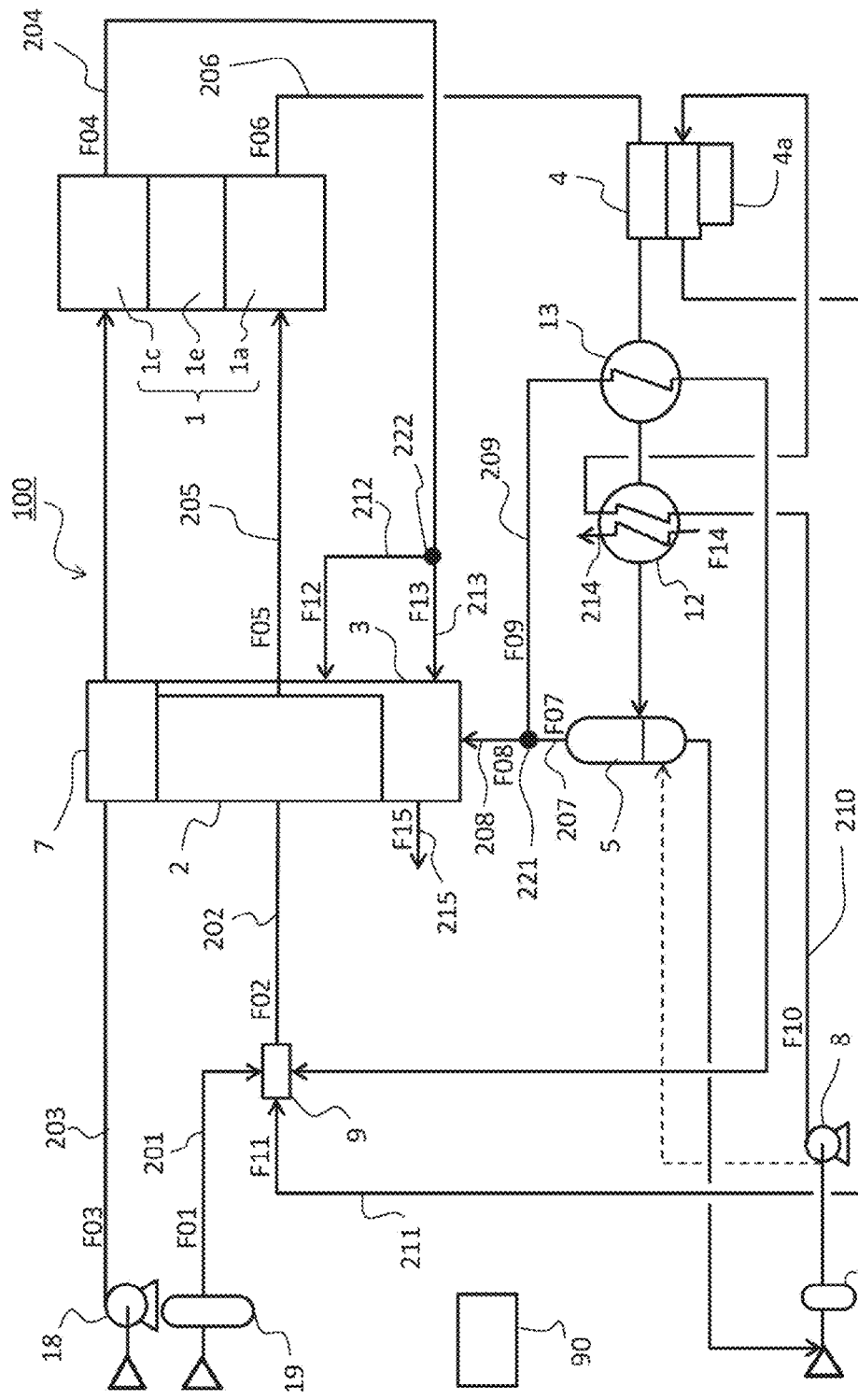
FIG. 8 is a flow diagram showing the configuration of a fuel cell system according to a modification of embodiment 4.

In this modification, an example of using a heat recovery cooler obtained by integrating a heat recovery exchanger and a water heat exchanger will be described. FIG. 8 is a schematic flow diagram illustrating the configuration of a fuel cell system according to the modification. The configurations other than integration of the heat exchanger are the same as those in the above example, and the description of the same parts is omitted.

In the fuel cell system 100 according to this modification, as shown in FIG. 8, a heat recovery heat exchanger 12 obtained by integrating the heat recovery cooler 10 and the water heat exchanger 11 is provided. From the anode exhaust gas F06 flowing through the anode exhaust gas system 206, thermal energy is given to the circulation water F10 flowing through the circulation water system 210 and the coolant F14 flowing through the heat recovery system 214, via the integrated heat recovery heat exchanger 12.

According to the present disclosure, the number of heat exchangers is decreased and the configuration can be compact. Thus, the heat dissipation amount can be reduced at low cost and the fuel cell system having further enhanced performance can be realized.

Embodiment 5

Figure 9:
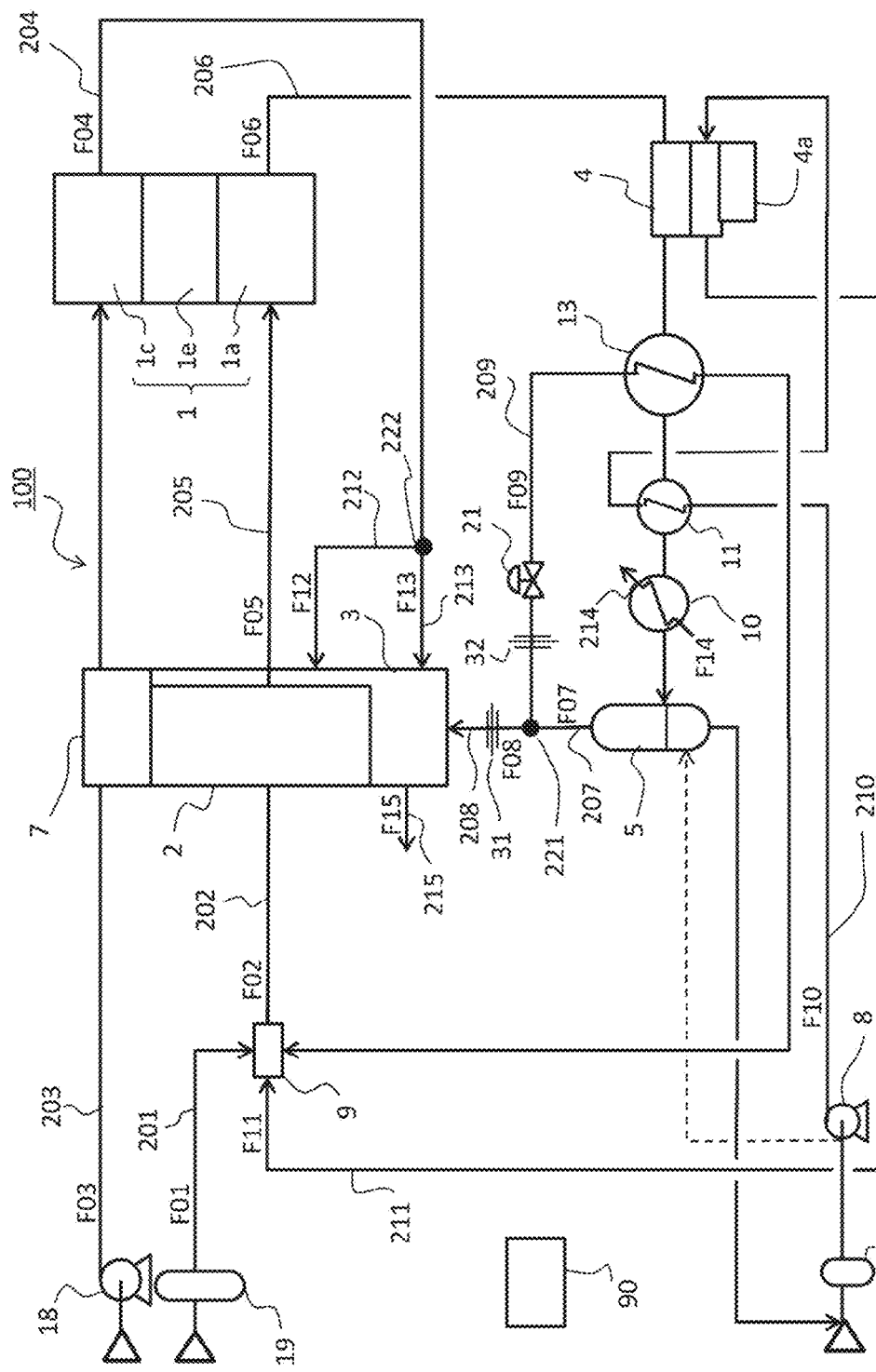
FIG. 9 is a flow diagram showing the configuration of a fuel cell system according to embodiment 5.

In the above embodiments 1 to 4, control for distribution from the anode recovered gas to the recycled combustion gas and the anode circulation gas is not considered. In embodiment 5, an example of a configuration for controlling distribution to the recycled combustion gas and the anode circulation gas will be described. FIG. 9 is a schematic flow diagram showing the configuration of a fuel cell system according to embodiment 5. In the example shown in FIG. 9, a configuration needed for distribution control of the anode recovered gas is added to the configuration in FIG. 7 used in the description of the fuel cell system according to embodiment 4. The configurations other than the configuration for distribution control of the anode recovered gas may be the same as those in embodiments 1 to 4. Regarding control operation and the like, FIG. 2 and FIG. 3 used in embodiment 1 are applied also here, and the description of the same parts as those in embodiments 1 to 4 is omitted.

In the fuel cell system 100 according to embodiment 5, as shown in FIG. 9, for adjusting the flow rate ratio of the recycled combustion gas F08 and the anode circulation gas F09, a circulation gas flow control valve 21 is provided to the anode circulation gas system 209. Further, a combustion gas flowmeter 31 for measuring the flow rate of the recycled combustion gas F08 is provided between the recovery branch portion 221 and the combustor 3, and a circulation gas flowmeter 32 for measuring the flow rate of the anode circulation gas F09 is provided between the recovery branch portion 221 and the circulation gas flow control valve 21. Each of the combustion gas flowmeter 31 and the circulation gas flowmeter 32 is formed by a combination of an orifice and a differential pressure gauge, for example, and outputs an electric signal corresponding to a pressure difference arising at the orifice part, as a signal indicating the flow rate, to the control unit 90.

The control unit 90 has stored therein data of target flow distribution ratios of the recycled combustion gas F08 and the anode circulation gas F09 in accordance with operation states. Then, the control unit 90 calculates a flow distribution ratio from pressure difference signals outputted from the combustion gas flowmeter 31 and the circulation gas flowmeter 32, and controls the circulation gas flow control valve 21 so as to make the distribution ratio appropriate in accordance with the operation state at this time. For example, if the electric generation load of the fuel cell stack 1 is low, the heat dissipation amount of the reformer 2 relatively increases, so that thermal energy needed for the reformer 2 becomes insufficient. Therefore, the target flow distribution ratio corresponding to the electric generation load is selected and the circulation gas flow control valve 21 is operated in a closing direction so that the flow rate of the recycled combustion gas F08 is increased. Alternatively, without storing such data, when insufficiency of thermal energy needed for the reformer 2, e.g., reduction in the temperature of the reformer 2, is detected, the circulation gas flow control valve 21 may be operated in a closing direction so that the flow rate of the recycled combustion gas F08 is increased.

According to the present disclosure, the circulation gas flow control valve 21 can be operated in an environment at about 60° C., for example, and therefore a special flow control valve for high-temperature application is not needed and a standard flow control valve can be used. Thus, it is possible to easily provide the fuel cell system 100 having high controllability and high reliability. In addition, since flow rate measurements are performed for gases having the same physical property, the configuration is made such that only the distribution ratio is calculated from the ratio of the pressure differences in flowing through the orifices.

Therefore, as compared to a case of measuring the absolute values of the flow rates of the anode circulation gas F09 and the recycled combustion gas F08, the distribution ratio can be obtained using simple measurement instruments, irrespective of change in the gas composition, the temperature, or the like. Thus, for example, even if the moisture amount of the anode recovered gas F07 changes due to condensation, the anode circulation gas F09 and the recycled combustion gas F08 can be appropriately distributed at the recovery branch portion 221, whereby the efficiency of the fuel cell system 100 can be enhanced.

In the present disclosure, the example in which the circulation gas flow control valve 21 is provided between the circulation gas flowmeter 32 and the circulation heat exchanger 13 in the anode circulation gas system 209, has been shown. However, the present disclosure is not limited thereto. For example, the circulation gas flow control valve 21 may be provided between the combustion gas flowmeter 31 and the combustor 3 in the recycled combustion gas system 208, whereby the same effects can be provided.

Embodiment 6

Figure 10:
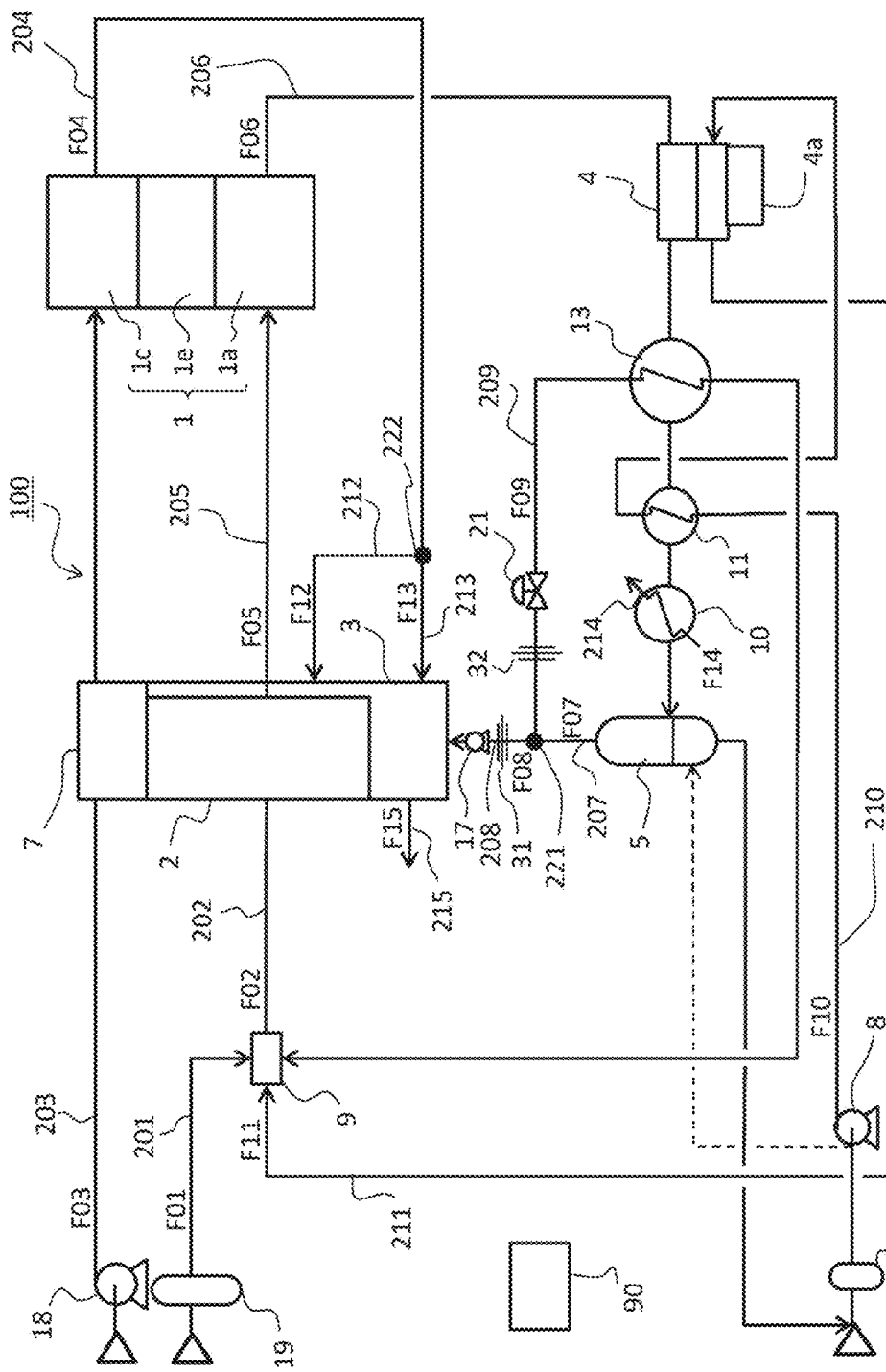
FIG. 10 is a flow diagram showing the configuration of a fuel cell system according to embodiment 6.

In the above embodiments 1 to 5, adjusting the pressure difference between the anode and the cathode is not described. In embodiment 6, an example of a configuration that allows the pressure of the anode recovered gas to be adjusted for reducing the pressure difference between the anode and the cathode, will be described. FIG. 10 is a schematic flow diagram showing the configuration of a fuel cell system according to embodiment 6. In the example shown in FIG. 10, a configuration needed for adjusting the pressure of the anode recovered gas is added to the configuration in FIG. 9 used in the description of the fuel cell system according to embodiment 5. The configurations other than the configuration for adjusting the pressure of the anode recovered gas may be the same as those in embodiments 1 to 5. Regarding control operation and the like, FIG. 2 and FIG. 3 used in embodiment 1 are applied also here, and the description of the same parts as those in embodiments 1 to 5 is omitted.

In the fuel cell system 100 according to embodiment 6, as shown in FIG. 10, a pressure equalizing blower 17 for lowering the pressure of the anode recovered gas F07 is provided between the combustor 3 and the combustion gas flowmeter 31 of the recycled combustion gas system 208.

The recycled combustion gas F08 which is a part of the anode exhaust gas F06 and the combustion support gas F13 which is a part of the cathode exhaust gas F04 from the fuel cell stack 1 are combusted and then merge to be discharged as the combusted exhaust gas F15. Although the flow rate of the gas flowing through the anode system greatly decreases through its course, since the vaporizer 4, the circulation heat exchanger 13, the water heat exchanger 11, the heat recovery cooler 10, and the water separator 5 are present in the anode system, pressure loss is greater than that of the gas flowing through the cathode system. The pressure equalizing blower 17 sucks the recycled combustion gas F08, thereby lowering the static pressure of the gas flowing through the anode system, so that the gas pressure in the anode 1*a* of the fuel cell stack 1 becomes close to the gas pressure in the cathode 1*c*.

According to the present disclosure, the pressure equalizing blower 17 can be operated in an environment at about 60° C., for example, and therefore a special blower for high-temperature application is not needed. Since the pressure difference between the anode 1*a* and the cathode 1*c* can be reduced by the pressure equalizing blower 17, occurrence of gas leak (crossover) through the electrolyte 1e is prevented and deterioration of the fuel cell stack 1 is inhibited, whereby the fuel cell system 100 having high performance can be provided. As long as the static pressure of the anode exhaust gas F06 can be lowered to be close to that of the cathode exhaust gas F04, the pressure equalizing blower 17 may be provided in, for example, the anode recovered gas system 207, so as to suck the anode recovered gas F07. Also in this case, as long as the pressure equalizing blower 17 is provided on the downstream side of the water separator 5, the influence of condensation on the pressure equalizing blower 17 is reduced and thus the pressure can be stabilized.

Embodiment 7

Figure 11:
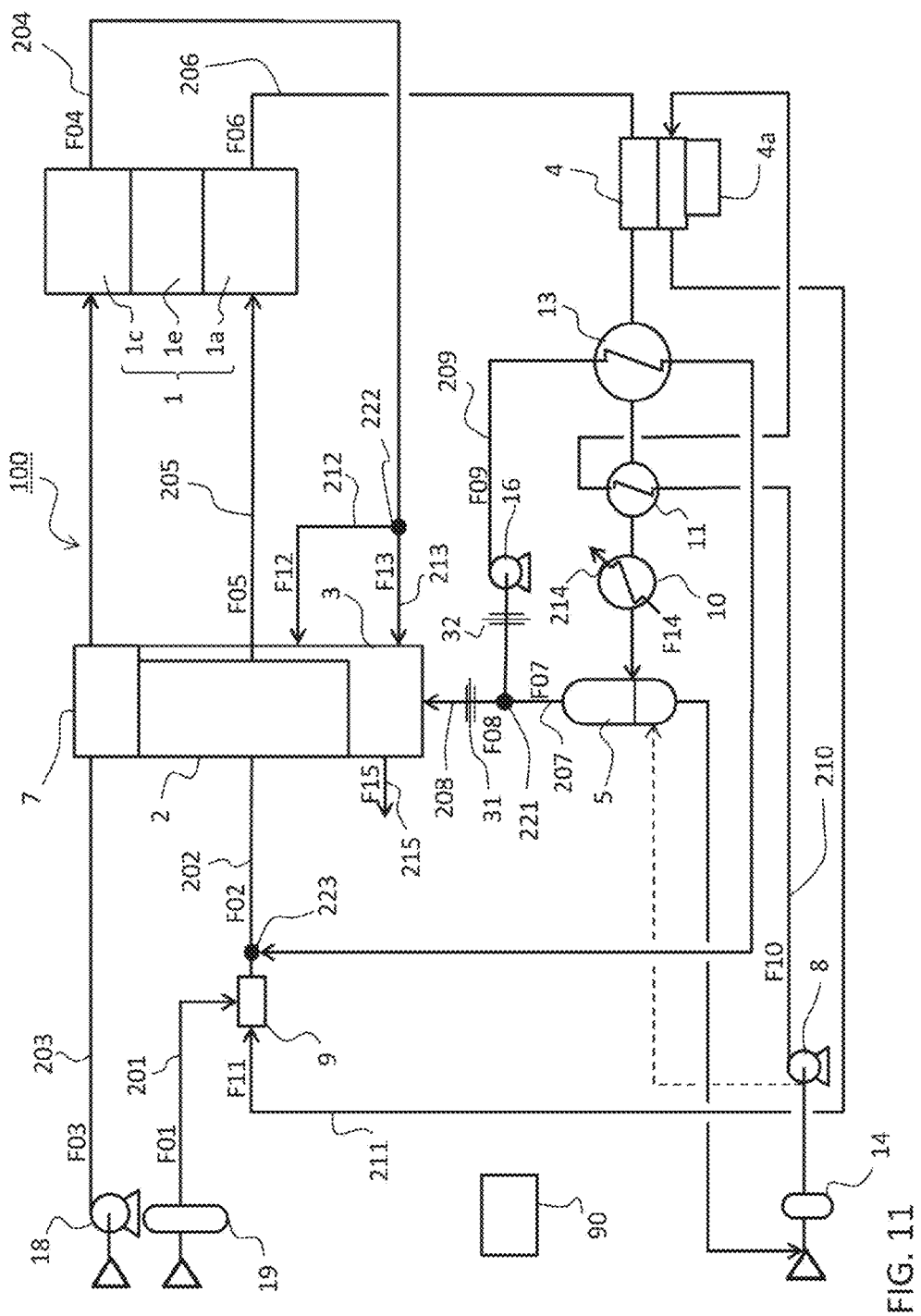
FIG. 11 is a flow diagram showing the configuration of a fuel cell system according to embodiment 7.

In the above embodiments 1 to 6, the example in which, using steam as a drive fluid, the ejector composing the circulator sucks the anode circulation gas, has been shown. However, the present disclosure is not limited thereto. In embodiment 7, an example of a configuration that allows the anode circulation gas to be mixed with the raw fuel even when the momentum of the drive fluid is small, will be described. FIG. 11 is a schematic flow diagram showing the configuration of a fuel cell system according to embodiment 7. In the example shown in FIG. 11, the circulation gas flow control valve in FIG. 9 used in description of the fuel cell system according to embodiment 5 is replaced with a circulation blower for mixing the anode circulation gas with the raw fuel. The configurations other than the configuration for mixing the anode circulation gas with the source gas may be the same as those in embodiments 1 to 6. Regarding control operation and the like, FIG. 2 and FIG. 3 used in embodiment 1 are applied also here, and the description of the same parts as those in embodiments 1 to 6 is omitted.

In the fuel cell system 100 according to embodiment 7, as shown in FIG. 11, a circulation blower 16 is provided between the recovery branch portion 221 and the circulation heat exchanger 13 in the anode circulation gas system 209. Then, the anode circulation gas system 209 is connected to, instead of the circulator 9, a mixing portion 223 provided on the downstream side of the circulator 9 in the fuel gas system 202. Therefore, the steam F11 and the raw fuel F01 merge in the circulator 9, and then merge with the anode circulation gas F09 at the mixing portion 223 provided on the downstream side of the circulator 9.

Unlike the above embodiments 1 to 6, the circulator 9 in embodiment 7 sucks only the raw fuel F01, using the steam F11 as a drive fluid. Then, at the mixing portion 223 provided on the downstream side of the circulator 9, the above gas merges with the anode circulation gas F09 whose pressure has been increased by the circulation blower 16 and which is supplied through the anode circulation gas system 209, and the merged gas is supplied to the reformer 2. It is noted that the anode circulation gas F09 is supplied to the mixing portion 223 in a state in which the anode circulation gas F09 has been heated by thermal energy from the anode exhaust gas F06 in the circulation heat exchanger 13 provided on the downstream side of the circulation blower 16.

Such a configuration is preferably applied to, among various fuel cell systems 100, the fuel cell system 100 in which the absolute flow rate of the steam F11 is small, for example. If the absolute flow rate of the steam F1l is small, the momentum of the steam F11 serving as a drive fluid for the ejector is small, and therefore only the raw fuel F01 is sucked in the circulator 9. Meanwhile, the pressure of the anode circulation gas F09 is increased using the circulation blower 16.

According to the present disclosure, the circulation blower 16 can be operated in an environment at about 60° C., for example, and therefore a special blower for high-temperature application need not be employed. Further, since the flow rate of the anode circulation gas F09 is smaller than the flow rate of the anode exhaust gas F06, the circulation blower 16 can be downsized and power consumption thereof can be reduced. Thus, although an auxiliary motive power source for the circulation blower 16 is needed, increase in power consumption is suppressed as much as possible, whereby the fuel cell system having high efficiency can be realized.

In the present disclosure, the example in which, of the anode circulation gas F09 and the raw fuel F01, the raw fuel F01 is sucked by the circulator 9, has been shown. However, the present disclosure is not limited thereto. For example, in a case where the raw fuel F01 is city gas, generally, the raw fuel F01 is supplied at a pressure of about 2 kPa. Therefore, the raw fuel system 201 may be connected to the mixing portion 223 and the anode circulation gas system 209 may be connected to the circulator 9 without the circulation blower 16. That is, of the anode circulation gas F09 and the raw fuel F01, the anode circulation gas F09 may be sucked by the circulator 9. Such a configuration can be preferably applied to the fuel cell system 100 in which the absolute flow rate of the steam F11 is small, without adding an auxiliary device and an auxiliary motive power source.

Embodiment 8

Figure 12:
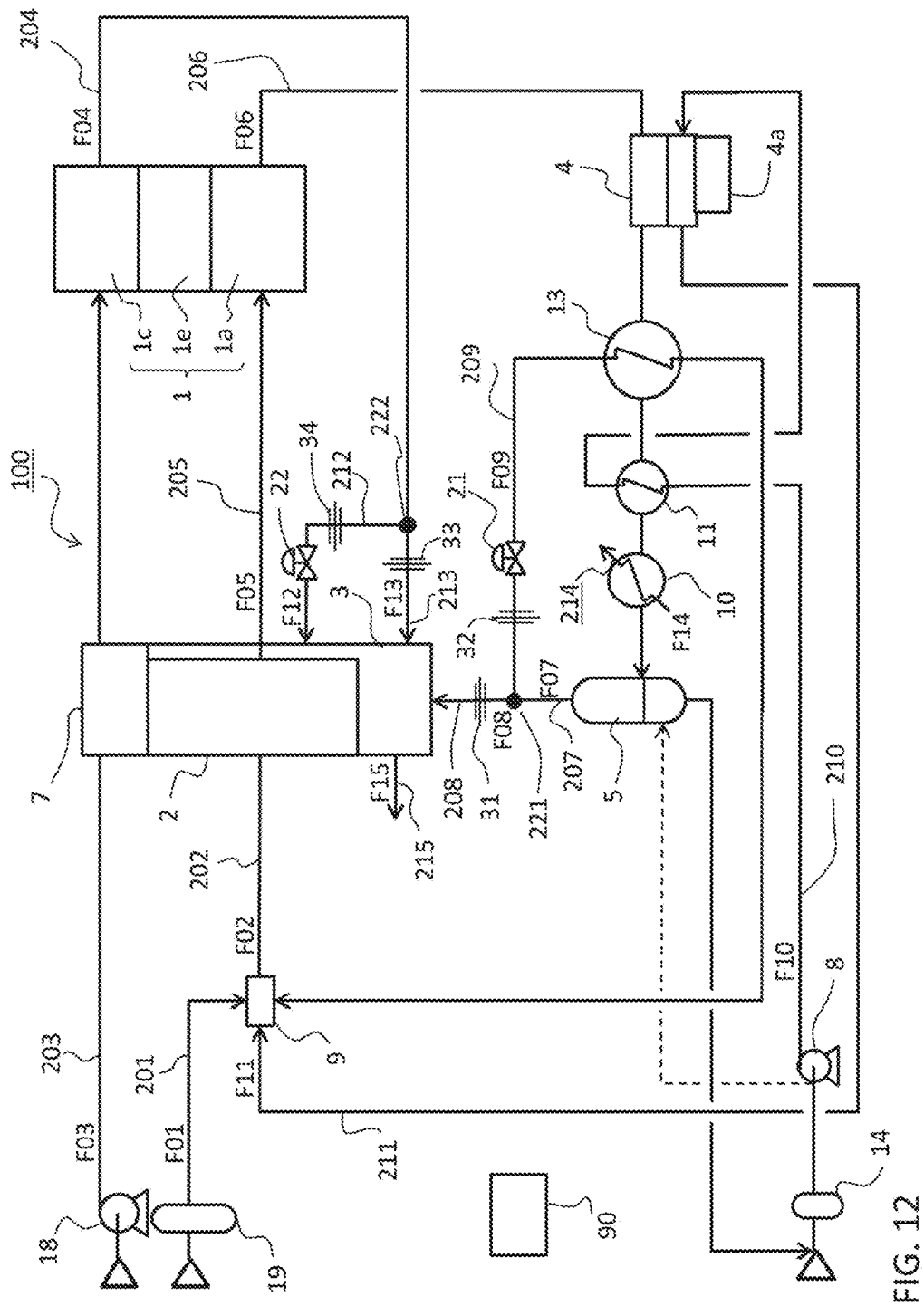
FIG. 12 is a flow diagram showing the configuration of a fuel cell system according to embodiment 8.

In the above embodiments 3 to 7, control for distributing the cathode exhaust gas to the preheating support gas and the combustion support gas is not considered. In embodiment 8, an example of a configuration for controlling distribution to the preheating support gas and the combustion support gas will be described. FIG. 12 is a schematic flow diagram showing the configuration of a fuel cell system according to embodiment 8. In the example shown in FIG. 12, a configuration needed for distribution control of the cathode exhaust gas is added to the configuration in FIG. 9 used for description of the fuel cell system according to embodiment 5. The configurations other than the configuration for distribution control of the cathode exhaust gas may be the same as those in embodiments 1 to 7. Regarding control operation and the like, FIG. 2 and FIG. 3 used in embodiment 1 are applied also here, and the description of the same parts as those in embodiments 1 to 7 is omitted.

In the fuel cell system 100 according to embodiment 8, as shown in FIG. 12, for adjusting the flow rate ratio of the preheating support gas F12 and the combustion support gas F13, a combustion support gas flow control valve 22 is provided between the reformer 2 and the air branching portion 222 in the preheating support gas system 212. Further, a combustion support gas flowmeter 33 for measuring the flow rate of the combustion support gas F13 is provided between the air branching portion 222 and the combustor 3, and a preheating support gas flowmeter 34 for measuring the flow rate of the preheating support gas F12 is provided between the air branching portion 222 and the combustion support gas flow control valve 22. Each of the combustion support gas flowmeter 33 and the preheating support gas flowmeter 34 is formed by a combination of an orifice and a differential pressure gauge, for example, and outputs an electric signal corresponding to a pressure difference arising at the orifice part, as a signal indicating the flow rate, to the control unit 90.

The control unit 90 has stored therein data of target flow distribution ratios of the preheating support gas F12 and the combustion support gas F13. Then, the control unit 90 calculates a flow distribution ratio from pressure difference signals outputted from the combustion support gas flowmeter 33 and the preheating support gas flowmeter 34, and controls the combustion support gas flow control valve 22 so as to make the distribution ratio appropriate in accordance with the operation state at this time. The target flow distribution ratio of the preheating support gas F12 and the combustion support gas F13 may be a constant value irrespective of the operation state. In this case, in the combustion support gas flow control valve 22, self-control may be performed so as to achieve a predetermined flow distribution by calculating the flow distribution ratio from signals obtained from the combustion support gas flowmeter 33 and the preheating support gas flowmeter 34.

In the present disclosure, since flow rate measurements are performed for gases having the same physical property, the configuration is made such that only the distribution ratio is calculated from the ratio of the pressure differences in flowing through the orifices. Therefore, as compared to a case of measuring the absolute values of the flow rates of the preheating support gas F12 and the combustion support gas F13, the distribution ratio can be obtained using simple measurement instruments, irrespective of change in the gas composition, the temperature, or the like.

On the other hand, although a valve for high-temperature application needs to be used for the combustion support gas flow control valve 22, by controlling the flow rate of the combustion support gas F13, the ratio of the combustible gas and the combustion support gas in the combustor 3 can be adjusted. Thus, the flame temperature can be changed and temperature control of the reformer 2 becomes easy. As a result, hydrogen is stably generated and output of the fuel cell stack 1 is stabilized, whereby the fuel cell system 100 having high reliability can be provided.

In the present disclosure, the example in which the combustion support gas flow control valve 22 is provided in the preheating support gas system 212 has been shown. However, without limitation thereto, the combustion support gas flow control valve 22 may be provided in the combustion support gas system 213, whereby the same effects are provided.

In the above embodiments 1 to 8, the medium flowing through the heat recovery system 214 is typically the coolant F14 such as water, but is not limited thereto. Another type of coolant or a heat storage material may be used as long as thermal energy can be received. The water treatment device 14 may be, for example, ion exchange resin. Alternatively, a permeable membrane may be used, or depending on required specifications, only a filter may be used or the water treatment device 14 may not be provided if not necessary.

In the above description, it is described that the condensation temperature in the water separator 5 is about 60° C. as a representative example. However, without limitation thereto, it is desirable to make setting so that the condensed water amount per time is not less than the flow rate of the circulation water F10. In this case, after the fuel cell system 100 is started, it is unnecessary to supply water from outside of the system, and thus a water-self-support system can be achieved, whereby system operation cost can be reduced.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the present disclosure. For example, at least one of the constituent components may be modified, added, or eliminated. At least one of the constituent components (e.g., difference between the preferred embodiments) may be selected and combined with the constituent components mentioned in another preferred embodiment.

As described above, the fuel cell system 100 according to each embodiment includes: a reformer 2 which generates a reformed gas F05 containing hydrogen by reacting hydrocarbon and moisture with each other; a fuel cell stack 1 which generates electric energy through electrochemical reaction of the reformed gas F05 and an oxidant F03 separated from each other at an anode 1a and a cathode 1c; an ejector (circulator 9) which, using, as a drive fluid, steam F1l to be used as the moisture, sucks either a raw fuel F01 containing the hydrocarbon or a recycled gas (an anode recovered gas F07, more specifically, an anode circulation gas F09 distributed from the anode recovered gas F07) recovered from an anode exhaust gas F06, and supplies a resultant gas to the reformer 2; and a vaporizer 4 which generates the steam F1l by vaporizing water, wherein an operation temperature of the fuel cell stack 1 is higher than a boiling point of water at an operation pressure, and the vaporizer 4 generates the steam F1l through heat exchange with the anode exhaust gas F06. Thus, since the steam F11 is generated using heat of the anode exhaust gas F06, energy of the raw fuel F01 is effectively used, whereby efficiency is enhanced.

The fuel cell system 100 may further include: an auxiliary combustor 4a which heats the vaporizer 4 or performs heating for adding the steam F11; and a control unit 90 which adjusts timings of start and stop of the auxiliary combustor 4a in accordance with operation states of the reformer 2 and the fuel cell stack 1. Thus, even in a case where generation of the steam F1l in the vaporizer 4 is insufficient depending on the operation condition such as a fuel utilization or at the time of starting or stopping, it is possible to ensure an appropriate amount of steam F11 with minimum energy.

The fuel cell system 100 may further include: a cooler (heat recovery cooler 10 or heat recovery heat exchanger 12) which further cools the anode exhaust gas F06 from which heat has been absorbed in the vaporizer 4, to a temperature that is a dew point or lower; a water separator 5 which removes water droplets from the anode exhaust gas F06 cooled to the dew point or lower and recovers a resultant gas as the recycled gas (anode recovered gas F07); and a heat exchanger (circulation heat exchanger 13) which heats the recycled gas (the anode recovered gas F07, more specifically, the anode circulation gas F09 distributed from the anode recovered gas F07) through heat exchange with the anode exhaust gas F06 before cooling thereof by the cooler. Thus, by effectively using extra heat of the anode exhaust gas F06, it is possible to prevent condensation until the anode circulation gas F09 is supplied to the reformer 2.

In this case, the fuel cell system 100 may further include a water heat exchanger 11 which is provided on a downstream side of the heat exchanger (circulation heat exchanger 13) on a flow path (anode exhaust gas system 206) of the anode exhaust gas F06 and heats water (circulation water F10) to be supplied to the vaporizer 4 through heat exchange with the anode exhaust gas F06 before cooling thereof by the cooler (heat recovery cooler 10). Thus, the amount of heat needed in the vaporizer 4 is reduced, so that the range of operation conditions in which usage of the auxiliary combustor 4a or additional heating is needed is narrowed, whereby more efficient operation can be performed.

The fuel cell system 100 may further include: a gas distribution system (recovery branch portion 221, recycled combustion gas system 208, anode circulation gas system 209) which branches the recycled gas (the anode recovered gas F07, more specifically, the anode circulation gas F09 distributed from the anode recovered gas F07) into supply to the reformer 2 and supply to a combustor 3 for heating the reformer 2; a flow rate adjuster (e.g., combustion gas flowmeter 31, circulation gas flowmeter 32, circulation gas flow control valve 21) which adjusts a flow rate of the supply to the reformer 2 and a flow rate of the supply to the combustor 3, to a set ratio; and a control unit 90 which sets the ratio in accordance with an operation state of the fuel cell stack 1. Thus, the distribution ratio is optimized, whereby the reformer 2 involving endothermic reaction can be stably operated.

The fuel cell system 100 may further include a pressure equalizing blower 17 which sucks the recycled gas (anode recovered gas F07), to lower a static pressure of the anode exhaust gas F06. Thus, even in a case where pressure loss in passing through the vaporizer 4 or the like is great, the static pressure of the anode exhaust gas F06 can be made close to the static pressure of the cathode exhaust gas F04 so that the pressures can be equalized, whereby deterioration of the fuel cell stack 1 is inhibited and reliability is enhanced.

The fuel cell system 100 may further include: a blower (circulation blower 16) which increases a pressure of the recycled gas (the anode recovered gas F07, more specifically, the anode circulation gas F09 distributed from the anode recovered gas F07); and a mixing portion 223 which is provided between the ejector (circulator 9) and the reformer 2 and mixes the recycled gas (the anode circulation gas F09 as above) into the resultant gas obtained by sucking of the raw fuel F01. Thus, even in a system in which the absolute flow rate of the steam F1l is small, high-efficiency operation can be stably performed.

DESCRIPTION OF THE REFERENCE CHARACTERS

1: fuel cell stack, 1a: anode, 1c: cathode, 1e: electrolyte, 2: reformer, 3: combustor, 4: vaporizer, 4a: auxiliary combustor, 5: water separator, 7: oxidant heat exchanger, 8: water pump, 9: circulator (ejector), 10: heat recovery cooler, 11: water heat exchanger, 12: heat recovery heat exchanger, 13: circulation heat exchanger, 14: water treatment device, 16: circulation blower (blower), 17: pressure equalizing blower, 18: air blower, 19: raw fuel pretreatment device, 21: circulation gas flow control valve, 22: combustion support gas flow control valve, 31 combustion gas flowmeter, 32: circulation gas flowmeter, 33: combustion support gas flowmeter, 34: preheating support gas flowmeter, 90: control unit, 100: fuel cell system, 201: raw fuel system, 202: fuel gas system, 203: oxidant system, 204: cathode exhaust gas system, 205: reformed gas system, 206: anode exhaust gas system, 207: anode recovered gas system, 208: recycled combustion gas system, 209: anode circulation gas system, 210: circulation water system, 211: steam system, 212: preheating support gas system, 213: combustion support gas system, 214: heat recovery system, 215: combusted exhaust gas system, 221: recovery branch portion, 222: air branching portion, 223: mixing portion, F01: raw fuel, F02: fuel gas, F03: oxidant, F04: cathode exhaust gas, F05: reformed gas, F06: anode exhaust gas, F07: anode recovered gas, F08: recycled combustion gas, F09: anode circulation gas, F10: circulation water, F11: steam, F12: preheating support gas, F13: combustion support gas, F14: coolant, F15: combusted exhaust gas

The invention claimed is:

1. A fuel cell system comprising:
a reformer which generates a reformed gas containing hydrogen by reacting hydrocarbon and moisture with each other;
a fuel cell stack which generates electric energy through electrochemical reaction of the reformed gas and an oxidant separated from each other at an anode and a cathode;
an ejector which, using, as a drive fluid, steam to be used as the moisture, sucks either a raw fuel containing the hydrocarbon or a recycled gas recovered from an anode exhaust gas, and supplies a resultant gas to the reformer; and
a vaporizer which generates the steam by vaporizing water, wherein
an operation temperature of the fuel cell stack is higher than a boiling point of water at an operation pressure, and
the vaporizer generates the steam through heat exchange with the anode exhaust gas before the recycled gas is recovered therefrom.

2. The fuel cell system according to claim 1, further comprising:
an auxiliary combustor which heats the vaporizer or performs heating for adding the steam; and
a control unit which adjusts timings of start and stop of the auxiliary combustor in accordance with operation states of the reformer and the fuel cell stack.

3. The fuel cell system according to claim 1, further comprising:
a cooler which further cools the anode exhaust gas from which heat has been absorbed in the vaporizer, to a temperature that is a dew point or lower;
a water separator which removes water droplets from the anode exhaust gas cooled to the dew point or lower and recovers a resultant gas as the recycled gas; and
a heat exchanger which heats the recycled gas through heat exchange with the anode exhaust gas before cooling thereof by the cooler.

4. The fuel cell system according to claim 3, further comprising a water heat exchanger which is provided on a downstream side of the heat exchanger on a flow path of the anode exhaust gas and heats water to be supplied to the vaporizer through heat exchange with the anode exhaust gas before cooling thereof by the cooler.

5. The fuel cell system according to claim 2, further comprising:
a cooler which further cools the anode exhaust gas from which heat has been absorbed in the vaporizer, to a temperature that is a dew point or lower;
a water separator which removes water droplets from the anode exhaust gas cooled to the dew point or lower and recovers a resultant gas as the recycled gas; and
a heat exchanger which heats the recycled gas through heat exchange with the anode exhaust gas before cooling thereof by the cooler.

6. The fuel cell system according to claim 5, further comprising a water heat exchanger which is provided on a downstream side of the heat exchanger on a flow path of the anode exhaust gas and heats water to be supplied to the vaporizer through heat exchange with the anode exhaust gas before cooling thereof by the cooler.

7. The fuel cell system according to claim 1, further comprising:
- a gas distribution system which branches the recycled gas into supply to the reformer and supply to a combustor for heating the reformer;
- a flow rate adjuster which adjusts a flow rate of the supply to the reformer and a flow rate of the supply to the combustor, to a set ratio; and
- a control unit which sets the ratio in accordance with an operation state of the fuel cell stack.

8. The fuel cell system according to claim 2, further comprising:
- a gas distribution system which branches the recycled gas into supply to the reformer and supply to a combustor for heating the reformer;
- a flow rate adjuster which adjusts a flow rate of the supply to the reformer and a flow rate of the supply to the combustor, to a set ratio; and
- a control unit which sets the ratio in accordance with an operation state of the fuel cell stack.

9. The fuel cell system according to claim 3, further comprising:
- a gas distribution system which branches the recycled gas into supply to the reformer and supply to a combustor for heating the reformer;
- a flow rate adjuster which adjusts a flow rate of the supply to the reformer and a flow rate of the supply to the combustor, to a set ratio; and
- a control unit which sets the ratio in accordance with an operation state of the fuel cell stack.

10. The fuel cell system according to claim 4, further comprising:
- a gas distribution system which branches the recycled gas into supply to the reformer and supply to a combustor for heating the reformer;
- a flow rate adjuster which adjusts a flow rate of the supply to the reformer and a flow rate of the supply to the combustor, to a set ratio; and
- a control unit which sets the ratio in accordance with an operation state of the fuel cell stack.

11. The fuel cell system according to claim 1, further comprising a pressure equalizing blower which sucks the recycled gas, to lower a static pressure of the anode exhaust gas.

12. The fuel cell system according to claim 2, further comprising a pressure equalizing blower which sucks the recycled gas, to lower a static pressure of the anode exhaust gas.

13. The fuel cell system according to claim 3, further comprising a pressure equalizing blower which sucks the recycled gas, to lower a static pressure of the anode exhaust gas.

14. The fuel cell system according to claim 4, further comprising a pressure equalizing blower which sucks the recycled gas, to lower a static pressure of the anode exhaust gas.

15. The fuel cell system according to claim 7, further comprising a pressure equalizing blower which sucks the recycled gas, to lower a static pressure of the anode exhaust gas.

16. The fuel cell system according to claim 1, wherein the ejector sucks the raw fuel to obtain the resultant gas, the fuel cell system further comprising:
- a blower which increases a pressure of the recycled gas; and
- a mixing portion which is provided between the ejector and the reformer and mixes the recycled gas into the resultant gas obtained by sucking of the raw fuel.

17. The fuel cell system according to claim 2, wherein the ejector sucks the raw fuel to obtain the resultant gas, the fuel cell system further comprising:
- a blower which increases a pressure of the recycled gas; and
- a mixing portion which is provided between the ejector and the reformer and mixes the recycled gas into the resultant gas obtained by sucking of the raw fuel.

18. The fuel cell system according to claim 3, wherein the ejector sucks the raw fuel to obtain the resultant gas, the fuel cell system further comprising:
- a blower which increases a pressure of the recycled gas; and
- a mixing portion which is provided between the ejector and the reformer and mixes the recycled gas into the resultant gas obtained by sucking of the raw fuel.

19. The fuel cell system according to claim 4, wherein the ejector sucks the raw fuel to obtain the resultant gas, the fuel cell system further comprising:
- a blower which increases a pressure of the recycled gas; and
- a mixing portion which is provided between the ejector and the reformer and mixes the recycled gas into the resultant gas obtained by sucking of the raw fuel.

20. The fuel cell system according to claim 7, wherein the ejector sucks the raw fuel to obtain the resultant gas, the fuel cell system further comprising:
- a blower which increases a pressure of the recycled gas; and
- a mixing portion which is provided between the ejector and the reformer and mixes the recycled gas into the resultant gas obtained by sucking of the raw fuel.

* * * * *